United States Patent
Tanimura et al.

(10) Patent No.: US 10,267,683 B2
(45) Date of Patent: Apr. 23, 2019

(54) COLORIMETRY DEVICE AND COLORIMETRY METHOD HAVING A PATCH QUANTITY COMPARISON PROCESSING UNIT AND A SECOND POSITION CORRECTION PROCESSING UNIT

(71) Applicant: KONICA MINOLTA, INC., Chiyoda-ku (JP)

(72) Inventors: Yasutaka Tanimura, Nara (JP); Ryoji Bando, Sakai (JP); Koji Harada, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 170 days.

(21) Appl. No.: 15/526,234

(22) PCT Filed: Nov. 4, 2015

(86) PCT No.: PCT/JP2015/080995
§ 371 (c)(1),
(2) Date: May 11, 2017

(87) PCT Pub. No.: WO2016/076165
PCT Pub. Date: May 19, 2016

(65) Prior Publication Data
US 2017/0314994 A1 Nov. 2, 2017

(30) Foreign Application Priority Data
Nov. 14, 2014 (JP) .................. 2014-231863

(51) Int. Cl.
*G01J 3/46* (2006.01)
*G01J 3/52* (2006.01)
(Continued)

(52) U.S. Cl.
CPC . *G01J 3/52* (2013.01); *G01J 3/46* (2013.01); *G01J 3/465* (2013.01); *H04N 1/46* (2013.01);
(Continued)

(58) Field of Classification Search
CPC ...... G01J 3/52; G01J 3/46; G01J 3/465; G01J 3/462; B65H 3/06; B65H 5/06; G01N 21/251; H04N 1/60
(Continued)

(56) References Cited

U.S. PATENT DOCUMENTS

| | | |
|---|---|---|
| 6,765,674 B2 | 7/2004 | Orelli et al. |
| 8,488,188 B2 * | 7/2013 | Nomura ............ G03G 15/5062 358/1.18 |

FOREIGN PATENT DOCUMENTS

| | | |
|---|---|---|
| JP | 2000-253262 | 9/2000 |
| JP | 2005-59493 | 3/2005 |

(Continued)

*Primary Examiner* — Que Tan Le
(74) *Attorney, Agent, or Firm* — Cozen O'Connor

(57) ABSTRACT

In a colorimetric device and a colorimetric method according to the present invention, chart definition information including at least patch position definition information representing each position of a plurality of patches in a color chart is stored, patch position measurement information representing the position of the patch is obtained on the basis of an image of the color chart, patch position correction information is obtained by correcting the patch position measurement information on the basis of the chart definition information, and then, each color of the plurality of patches is measured in each of the positions of the plurality of patches represented by the patch position correction information.

8 Claims, 17 Drawing Sheets

(51) Int. Cl.
   *H04N 1/46*   (2006.01)
   *H04N 1/60*   (2006.01)
   *H04N 1/58*   (2006.01)
   *B65H 3/06*   (2006.01)
   *B65H 5/06*   (2006.01)

(52) U.S. Cl.
   CPC ............... *H04N 1/58* (2013.01); *H04N 1/60* (2013.01); *H04N 1/6033* (2013.01); *B65H 3/06* (2013.01); *B65H 5/06* (2013.01)

(58) Field of Classification Search
   USPC ...................................................... 250/208.1
   See application file for complete search history.

(56) References Cited

FOREIGN PATENT DOCUMENTS

| | | |
|---|---|---|
| JP | 2005-70215 | 3/2005 |
| JP | 2009-60221 | 3/2009 |
| JP | 2010-217721 | 9/2010 |
| JP | 2012-213053 | 11/2012 |
| JP | 2013-213758 | 10/2013 |
| WO | WO 2013/145295 | 10/2013 |

* cited by examiner

CTd

CTe

CTf

EDGE LINE (−), INTERMEDIATE LINE (···), AND PATCH CENTER POSITION (○)

US 10,267,683 B2

COLORIMETRY DEVICE AND COLORIMETRY METHOD HAVING A PATCH QUANTITY COMPARISON PROCESSING UNIT AND A SECOND POSITION CORRECTION PROCESSING UNIT

RELATED APPLICATIONS

This is a U.S. National Phase Application under 35 USC 371 of International Application PCT/JP2015/080995 filed on Nov. 4, 2015.

This application claims the priority of Japanese application no. 2014-231863 filed Nov. 14, 2014, the entire content of which is hereby incorporated by reference.

TECHNICAL FIELD

The present invention relates to a colorimetric device and a colorimetric method, which measure a color, and in particular, relates to a colorimetric device and a colorimetric method, which are capable of automatically performing colorimetry in a suitable position.

BACKGROUND ART

For example, a company producing a color printed material, such as a printing company, periodically performs colorimetry with respect to the color of the printed material, and adjust the color of a printing device printing the printed material, in order to retain the quality of the printed material. In such color adjustment of the printing device, for example, original image data referred to as a color chart is printed by the printing device, and each color of each patch in the printed color chart is measured by a colorimetric device. Then, a color deviation amount between actual measurement values of the colors of each of the patches and target values of the colors of each of the patches is evaluated, and the color of the printing device is adjusted according to the evaluation result.

The color chart is configured of a plurality of color samples referred to as the patch, and in many cases, a plurality of patches are respectively formed with colors (hue, brightness, and saturation), which are different from each other, and are respectively arranged in a predetermined aspect. There are various types in such a color chart. For example, there is a color chart of an aspect in which a plurality of quadrangular patches having various colors are arranged in the shape of a two-dimensional array in all directions. Further, in the color chart of such an aspect, there are various patterns such as a pattern in which the patches are respectively arranged such that random (arbitrary) color arrangement is obtained, according to the contents to be evaluated, or a pattern in which the patches are respectively arranged such that a change in contrasting density between patches adjacent to each other decreases as a gradation. Then, such a color chart is not only prepared by a user by using a color chart preparation tool which is provided by a manufacturer of the colorimetric device, but is also provided from a public institution. Such a color chart actually includes various patterns according to a difference in the shapes, the arrangement, color combination, and the like of the patches.

In contrast, the number of colors used for the color adjustment of the printing device has increased year after year, and according to this, the number of patches arranged in the color chart also increases, and the sizes (the areas) of each of the patches are small.

From such a circumstance, it is not virtually possible to accurately position a measurement portion of the colorimetric device with respect to each of the patches by manual and to perform colorimetry. For this reason, an automatic system is desired in which the positions of each of the patches are automatically measured, the measurement portion of the colorimetric device is automatically matched with the measured positions of each of the patches, and the colors of each of the patches are measured. In Patent Literature 1, a method of importing a two-dimensional color image of a color chart to be measured, of calculating the position of a patch by an image processing method using a computer, of moving a colorimetric head to a determined patch position, and of performing colorimetry with respect to the color chart, is proposed from Gretag-Macbeth AG, Incorporated, as an example of such a system.

In addition, there is a case where chart definition information describing attribute information relevant to the patch, such as of information of the positions of each of the patches or information of the colors of each of the patches, exists, according to a color chart, and thus, there is also a method of acquiring the positions of each of the patches from the chart definition information.

However, in a case where the colorimetric device automatically detects the positions of each of the patches as described above, and performs the colorimetry in the detected positions of each of the patches, there is a case where all of the positions of each of the patches are not capable of being automatically recognized, for example, due to chart failure (abnormality) such as fouling or damage in an actual chart or due to a chart having low contrast between the respective patches. For this reason, a case may occur in which the colorimetric device is not capable of necessarily suitably performing the colorimetry with respect to each of the patches.

On the other hand, even in a case where the colorimetric device acquires the positions of each of the patches from the chart definition information described above, and performs the colorimetry in the acquired positions of each of the patches, there is a case where paper on which the chart is printed expands and contracts, for example, due to a magnification deviation or a printing step of the printing device, such as heat fixing, or due to drying after printing, and the positions of each of the patches in the chart definition information deviates from the positions of each of the patches in the actual chart. For this reason, a case may occur in which the colorimetric device is not capable of necessarily suitably performing the colorimetry with respect to each of the patches.

CITATION LIST

Patent Literature

Patent Literature 1: U.S. Pat. No. 6,765,674

SUMMARY OF INVENTION

The present invention has been made in consideration of such circumstances described above, and an object of the present invention is to provide a colorimetric device and a colorimetric method, which are capable of performing colorimetry with respect to each patch in a more suitable position.

A colorimetric device according to the present invention includes: a colorimetric unit that measures a color; an imaging unit that acquires an image; a moving unit that relatively moves a position of the colorimetric unit with respect to a sheet of an object to be measured; a chart definition information storage unit that stores chart definition information including at least patch position definition information representing each position of a plurality of patches in a color chart, including the plurality of patches, which are predetermined color regions; an image acquisition processing unit that acquires an image of the color chart by the imaging unit; a patch position processing unit that obtains patch position measurement information representing the position of the patch on the basis of the image of the color chart which is acquired in the image acquisition processing unit; a patch position correction processing unit that obtains patch position correction information by correcting the patch position measurement information obtained in the patch position processing unit, on the basis of the chart definition information which is stored in the chart definition information storage unit; a color measurement processing unit that relatively moves the position of the colorimetric unit with respect to the color chart to each of the positions of the plurality of patches represented by the patch position correction information obtained in the patch, position correction processing unit by the moving unit, and measures each color of the plurality of patches by the colorimetric unit, wherein the chart definition information further includes patch quantity definition information representing the number of plurality of patches, and the patch position correction processing unit includes a patch quantity detection processing unit that obtains patch quantity measurement information representing the number of patches which is obtained from the image of the color chart on the basis of the patch position measurement information obtained in the patch position processing unit, a patch quantity comparison processing unit that compares the number of patches represented by the patch quantity definition information included in the chart definition information which is stored in the chart definition information storage unit with the number of patches represented by the patch quantity measurement information obtained in the patch quantity detection processing unit, and a second position correction processing unit that supplements or partially deletes the patch quantity measurement information depending on whether the number of patches represented by the patch quantity measurement information is less or greater than the number of patches represented by the patch quantity definition information, as a result of performing the comparison in the patch quantity comparison processing unit. For this reason, the colorimetric device and the colorimetric method according to the present invention are capable of performing the colorimetry with respect to each of the patches in a more suitable position.

The objects, the characteristics, and the advantages of the present invention described above and the others will be obvious from the following detailed description and the attached drawings.

DESCRIPTION OF EMBODIMENTS

Figure 1:
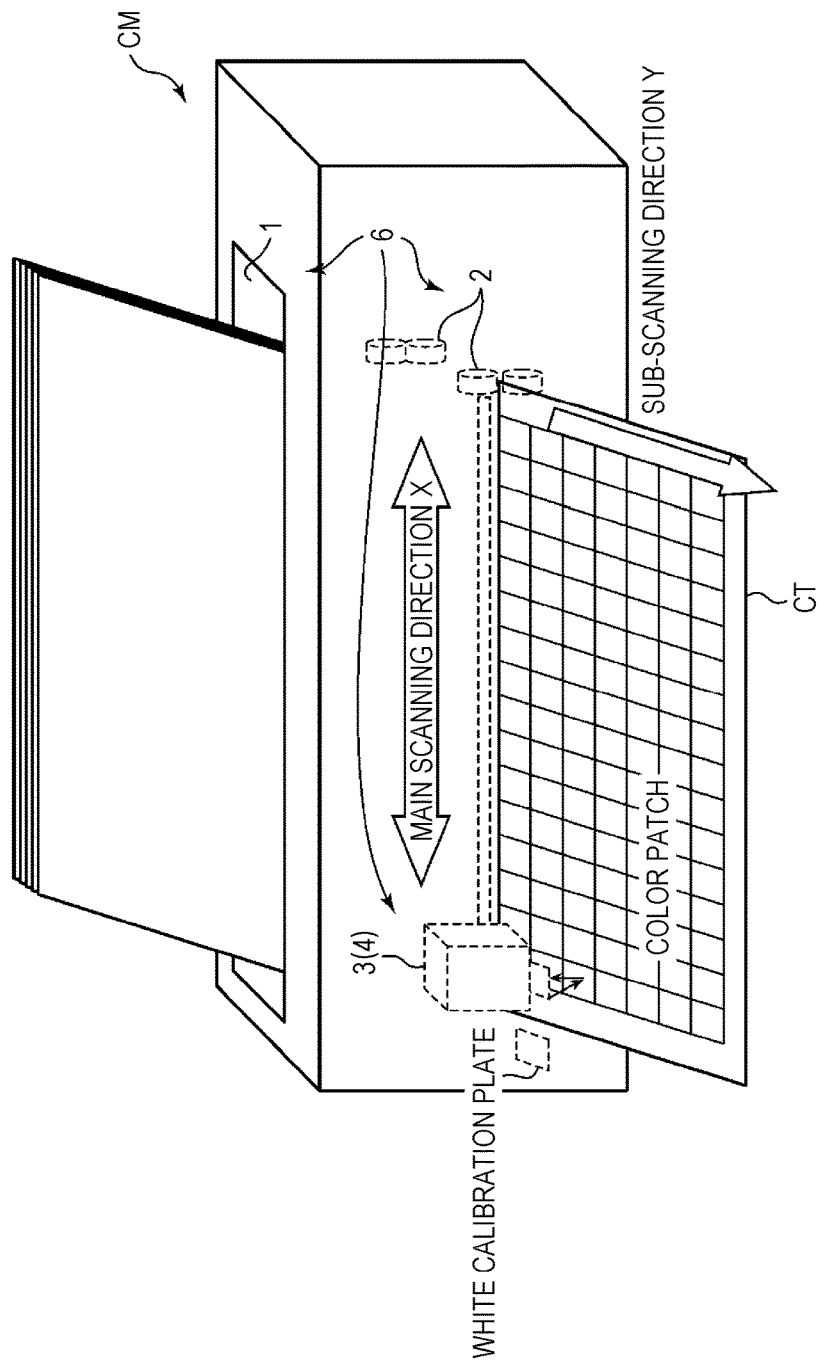
FIG. 1 is a perspective view illustrating a schematic configuration of a colorimetric device of an embodiment.

Hereinafter, an embodiment according to the present invention will be described on the basis of the drawings. Furthermore, in each of the drawings, configurations to which the same reference numerals are applied represent the same configurations, and the description thereof will be suitably omitted. Herein, reference numerals from which suffixes are omitted will be described in a case of collectively indicating the configurations, and reference numerals to which suffixes are attached will be described in a case of indicating each of the configurations.

Figure 2:
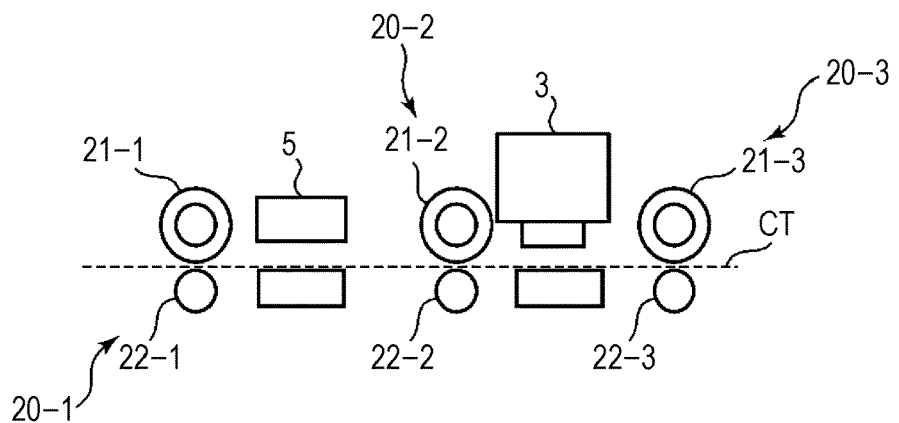
FIG. 2 is a schematic side view illustrating an arrangement relationship between an imaging unit and a colorimetric unit of the calorimetric device of the embodiment.
Figure 3:
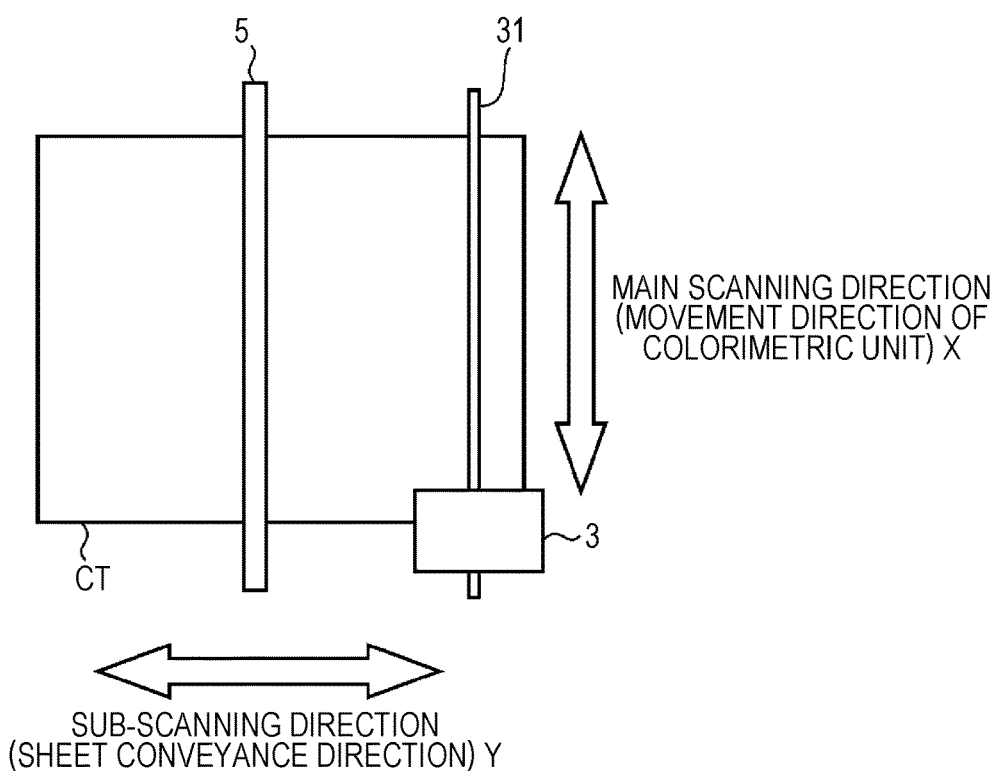
FIG. 3 is a schematic top view illustrating the arrangement relationship between the imaging unit and the colorimetric unit of the colorimetric device of the embodiment.
Figure 4:
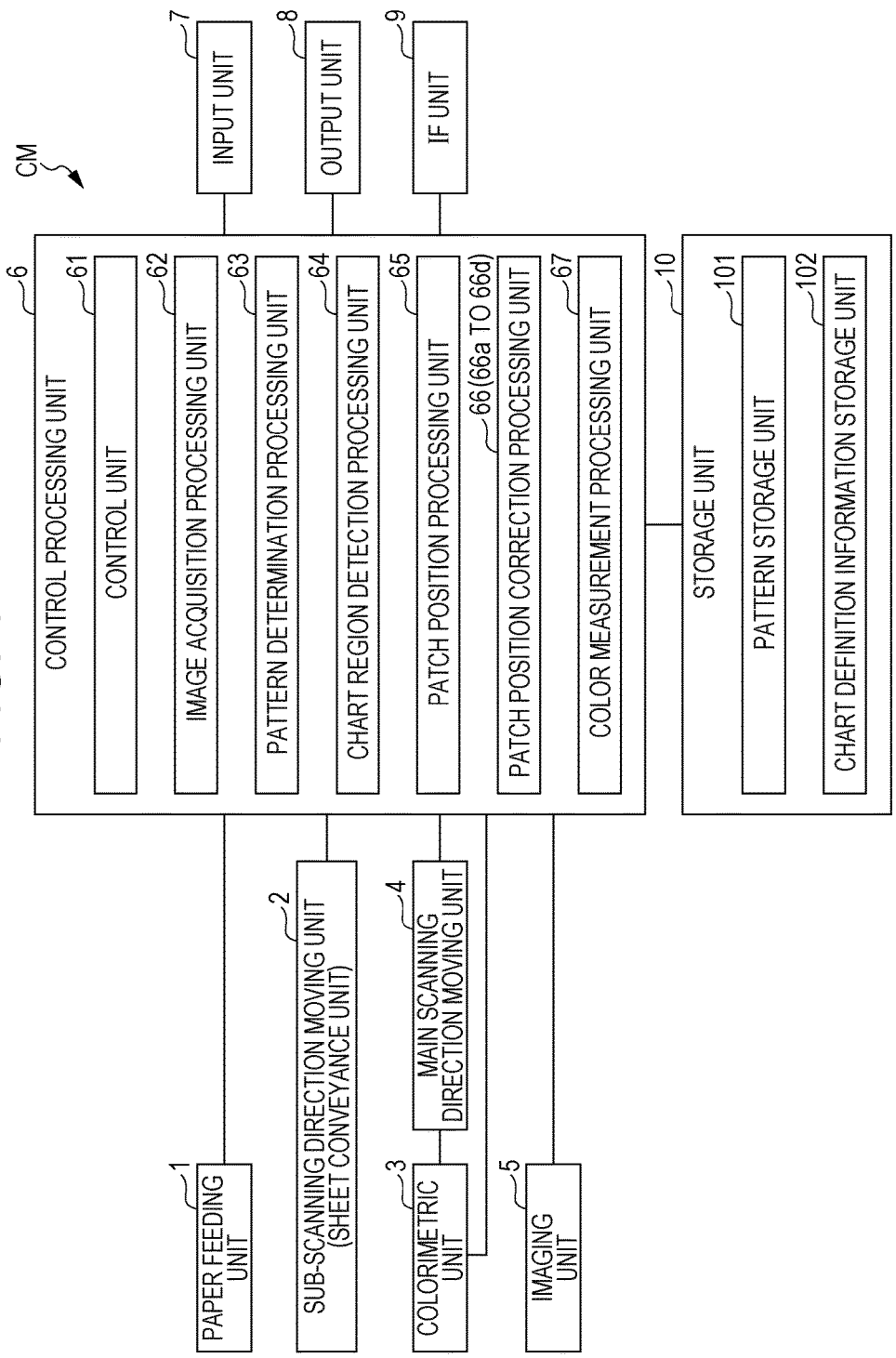
FIG. 4 is a block diagram illustrating an electrical configuration of the colorimetric device of the embodiment.
Figure 5:
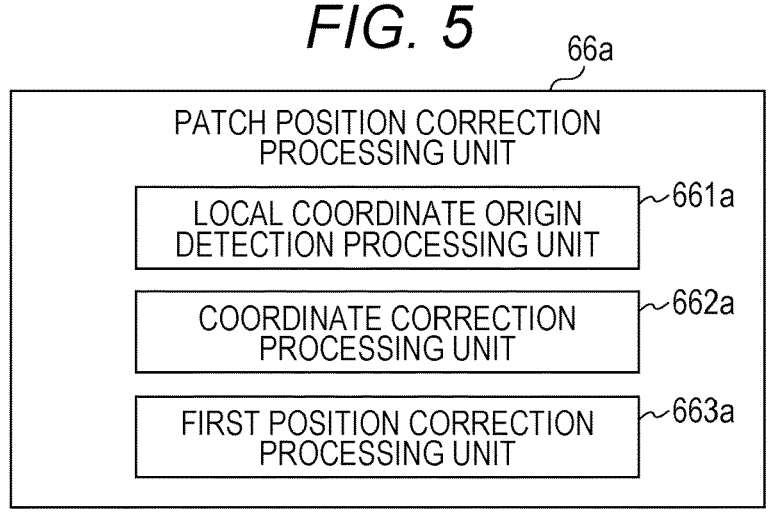
FIG. 5 is a block diagram illustrating a configuration of a patch position correction processing unit of a first aspect of the colorimetric device of the embodiment.
Figure 6:
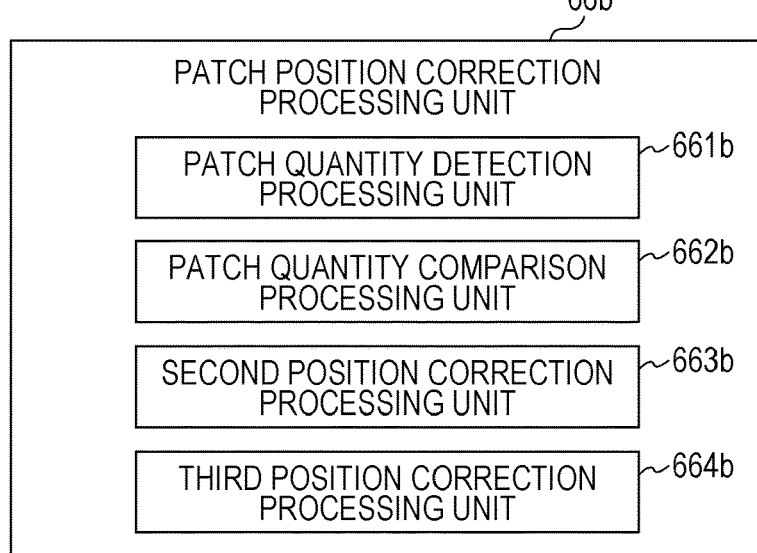
FIG. 6 is a block diagram illustrating a configuration of a patch position correction processing unit of a second aspect of the colorimetric device of the embodiment.
Figure 7:
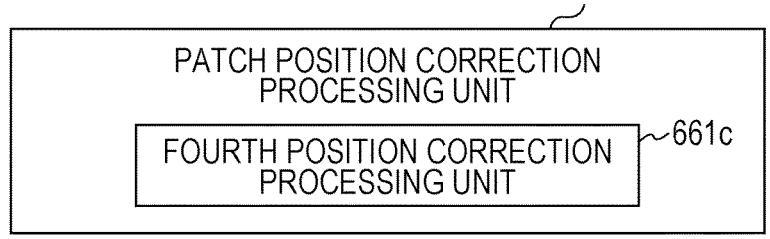
FIG. 7 is a block diagram illustrating a configuration of a patch position correction processing unit of a third aspect of the colorimetric device of the embodiment.
Figure 8:
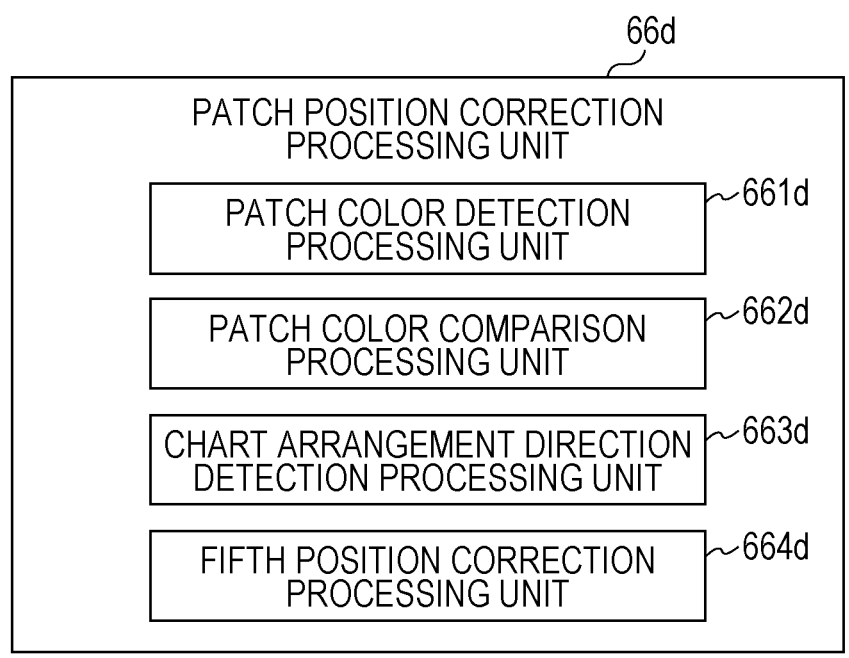
FIG. 8 is a block diagram illustrating a configuration of a patch position correction processing unit of a fourth aspect of the colorimetric device of the embodiment.
Figure 9A:
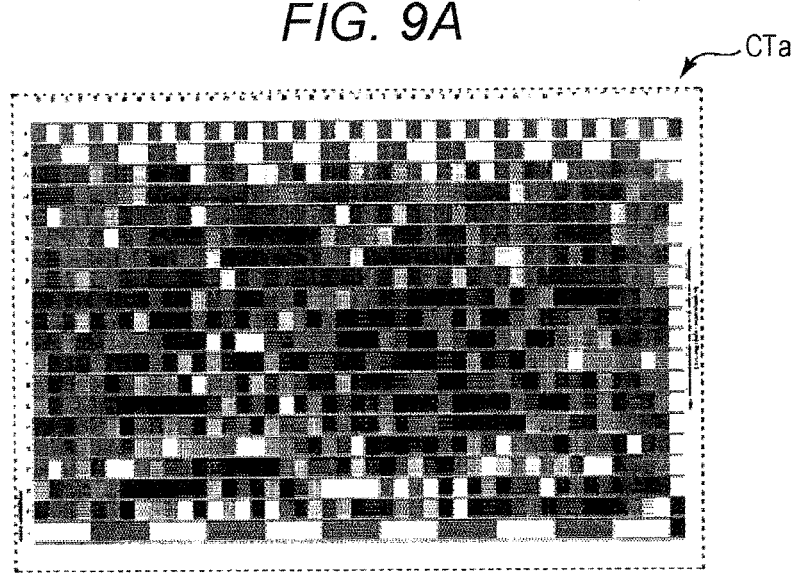
FIG. 9 is a diagram illustrating color charts of the first aspect to the third aspect, as an example.
Figure 9B:
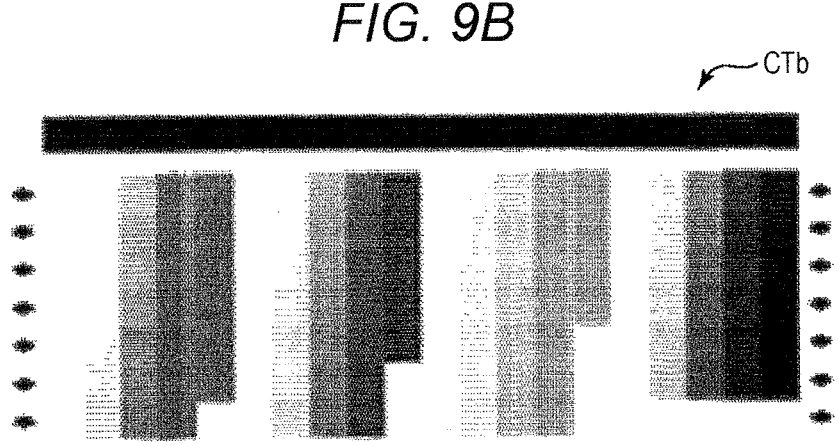
Figure 9C:
Figure 10A:
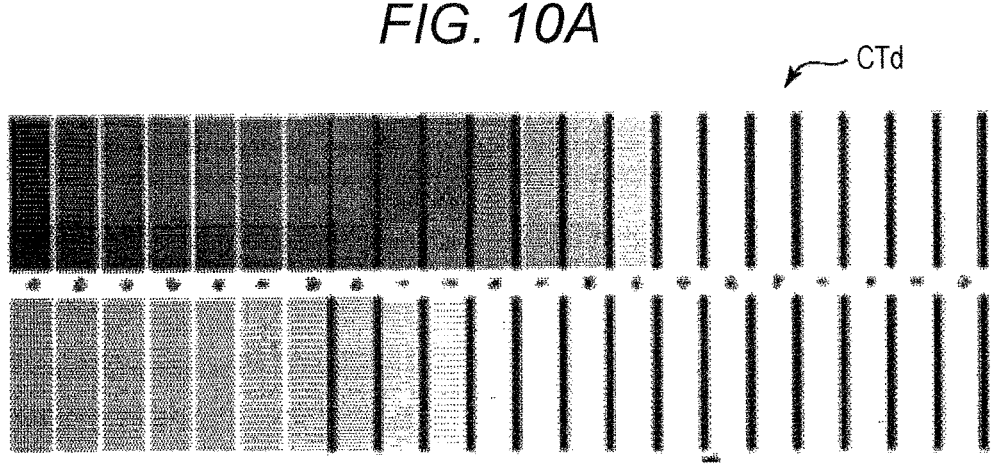
FIG. 10 is a diagram illustrating color charts of the fourth aspect to a sixth aspect, as an example.
Figure 10B:
Figure 10C:
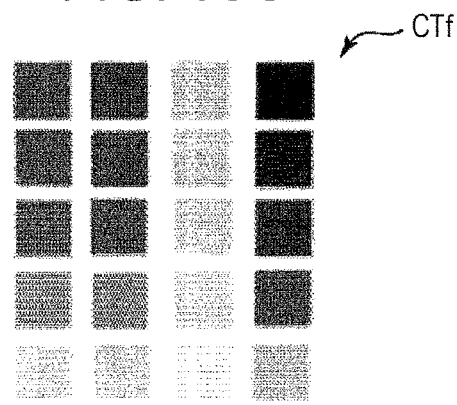

FIG. 1 is a perspective view illustrating a schematic configuration of a colorimetric device of an embodiment. FIG. 2 is a schematic side view illustrating an arrangement relationship between an imaging unit and a colorimetric unit of the colorimetric device of the embodiment. FIG. 3 is a schematic top view illustrating the arrangement relationship between the imaging unit and the colorimetric unit of the colorimetric device of the embodiment. FIG. 4 is a block diagram illustrating an electrical configuration of the colorimetric device of the embodiment. FIG. 5 is a block diagram illustrating a configuration of a patch position correction processing unit of a first aspect of the colorimetric device of the embodiment. FIG. 6 is a block diagram illustrating a configuration of a patch position correction processing unit of a second aspect of the colorimetric device of the embodiment. FIG. 7 is a block diagram illustrating a configuration of a patch position correction processing unit of a third aspect of the colorimetric device of the embodiment. FIG. 8 is a block diagram illustrating a configuration of a patch position correction processing unit of a fourth aspect of the colorimetric device of the embodiment. FIG. 9 is a diagram illustrating color charts of the first aspect to the third aspect, as an example. FIG. 9A illustrates a color chart CTa of the first aspect, FIG. 9B illustrates a color chart CTb of the second aspect, and then, FIG. 9O illustrates a color chart CTc of the third aspect. FIG. 10 is a diagram illustrating color charts of the fourth aspect to a sixth aspect, as an example. FIG. 10A illustrates a color chart CTd of the fourth aspect, FIG. 10B illustrates a color chart CTe of the fifth aspect, and then, FIG. 10C illustrates a color chart CTf of the sixth aspect.

A colorimetric device CM of this embodiment is a device measuring the color (the hue, the brightness, and the saturation) of an object to be measured, which is a colorimetric target, and for example, as illustrated in FIG. 1 to FIG. 4, includes a paper feeding unit 1, a sub-scanning direction moving unit (a sheet conveyance unit) 2, a colorimetric unit 3, a main scanning direction moving unit 4, an imaging unit 5, a control processing unit 6, an input unit 7, an output unit 8, an interface unit (an IF unit) 9, and a storage unit 10.

The paper feeding unit 1 is a sheet conveyance mechanism which is connected to the control processing unit 6, and imports a sheet of the object to be measured, set in the colorimetric device CM, into the colorimetric device CM, according to the control of the control processing unit 6. The sheet of the object to be measured may be an arbitrary sheet, and for example, in a case of adjusting the color of a printing device, the sheet of the object to be measured is a color chart CT including a plurality of patches which are regions of a predetermined color on predetermined paper. The paper feeding unit 1, for example, includes a container containing the sheet of the object to be measured, an importing unit, for example, configured of a pickup roller or the like, which picks up the sheet of the object to be measured contained in the container and imports the sheet into the colorimetric device CM, and an exporting unit, for examples, configured of a conveyance roller or the like, which conveys the sheet of the object to be measured imported by the importing unit to the sub-scanning direction moving unit 2.

The sub-scanning direction moving unit (the sheet conveyance unit) 2 is a sheet conveyance mechanism which is connected to the control processing unit 6, and conveys the sheet of the paper object to be measured, fed from the paper feeding unit 1, in a sub-scanning direction (a second direction) orthogonal to a first direction set in advance as a main scanning direction, by a predetermined amount in a unit conveyance instruction (a second unit conveyance instruction), according to the control of the control processing unit 6. The sub-scanning direction moving unit 2 is configured such that the conveyance can be performed forward and backward along the sub-scanning direction. The forward conveyance, for example, indicates that the sheet of the object to be measured is conveyed from the upstream side (the paper feeding unit 1 side) to the downstream side (a discharge side), and the backward conveyance indicates that the sheet of the object to be measured is conveyed in a direction opposite to that of the forward conveyance, that is, from the downstream side to the upstream side. The sub-scanning direction moving unit 2, for example, is configured of a plurality of sets of sheet conveyance roller portions, a driving unit rotatively driving the sheet conveyance rollers, and the like. Each of the sets of the sheet conveyance roller portions is configured of a driving roller rotatively driven by the driving unit, a driven roller rotatively driven according to the rotative driving of the driving roller, and the like. The driving unit, for example, is configured of a stepping motor (a sub-scanning stepping motor). In the sub-scanning direction moving unit 2 having such a configuration, a driving pulse of 1 pulse (a second driving pulse, an example of the second unit conveyance instruction) is input, and thus, the sub-scanning stepping motor is rotated by a predetermined angle (a twenty-first angle), the driving roller is also rotated by a predetermined angle (a twenty-second angle) according to the rotation of the sub-scanning stepping motor, and then, the sheet of the object to be measured is conveyed (moved) by a predetermined amount along the sub-scanning direction, according to the rotation of the driving roller. More specifically, in an example illustrated in FIG. 2, the sub-scanning direction moving unit 2 includes three sets of first to third sheet conveyance roller portions 20-1 to 20-3. The first to third sheet conveyance roller portions 20-1 to 20-3 are sequentially disposed from the upstream side to the downstream side along the sub-scanning direction. Each of the first to third sheet conveyance roller portions 20-1 to 20-3 includes first to third driving rollers 21-1 to 21-3 and first to third driven rollers 22-1 to 22-3. Furthermore, the first to third driving rollers 21-1 to 21-3 are rotated by first to third stepping motors (not illustrated) which are rotated in synchronization with each other. In the forward conveyance, the sheet of the object to be measured, fed from the paper feeding unit 1, is interposed between one pair of the first driving roller 21-1 and the first driven roller 22-1, and the first driving roller 21-1 is rotatively driven by the driving unit in normal rotation (for example, clockwise rotation), and thus, the sheet of the object to be measured is conveyed from the first sheet conveyance roller portion 20-1 to the second sheet conveyance roller portion 20-2. The sheet of the object to be measured which is conveyed to the second sheet conveyance roller portion 20-2 is similarly conveyed from the second sheet conveyance roller portion 20-2 to the third sheet conveyance roller portion 20-3 by the second sheet conveyance roller portion 20-2. Then, the sheet of the object to be measured which is conveyed to the third sheet conveyance roller portion 20-3 is similarly conveyed from the third sheet conveyance roller portion 20-3 to the downstream side by the third sheet conveyance roller portion 20-3. Then, in the backward conveyance, on the contrary to the forward conveyance described above, the first to third driving rollers 21-1 to 21-3 are rotatively driven by the driving unit in reverse rotation (in the example described above, counterclockwise rotation), and thus, the sheet of the object to be measured is conveyed from the downstream side to the upstream side.

Furthermore, in the following description, the main scanning direction (the first direction) is set to an X direction (a horizontal direction), and a coordinate axis set along the X direction is set to an X axis, the sub-scanning direction (the second direction) is set to a Y direction (a vertical direction), a coordinate axis set along the Y direction is set to a Y axis, and the directions and the axes are suitably used. A coordinate origin (a world coordinate origin) $PO_0$ is set to a predetermined position set in advance in an image which is imaged by the imaging unit 5 as described below, for example, an upper left vertex (an upper left edge) of the image in the plan view, and thus, the X axis and the Y axis are coincident with an X axis and a Y axis of a world coordinate system XY (refer to FIG. 19).

The colorimetric unit 3 is a device which is connected to the control processing unit 6, and measures the color of the object to be measured, according to the control of the control processing unit 6. The colorimetric unit 3, for example, is a colorimetric sensor or the like, which acquires predetermined optical information of the object to be measured in order to obtain the color of the object to be measured. Such a colorimetric unit 3, for example, is a spectroscopic colorimeter which includes a spectroscopic optical element, a photoelectric conversion element, or the like for measuring reflectance (or transmittance) at each wavelength, and measures the color of an object on the basis of the reflectance (or the transmittance) at each of the wavelengths. In addition, for example, the colorimetric unit 3 is a tristimulus value type colorimeter which includes an optical filter, a photoelectric conversion element, or the like for measuring tristimulus values of RGB, and measures the color of the object on the basis of a color difference in the tristimulus values. The colorimetric unit 3 is subjected to white calibration by measuring a so-called white calibration plate (a standard white plate) illustrated by a broken line in FIG. 1, on which a wavelength in a measurement range can be reflected with high reflectance (for example, approximately 90% to approximately 99%).

The main scanning direction moving unit 4 is a moving mechanism which is connected to the control processing unit 6, and moves the colorimetric unit 3 in the main scanning direction (the first direction) by a predetermined amount in predetermined unit conveyance instruction (first unit conveyance instruction), according to the control of the control processing unit 6. The main scanning direction moving unit 4, for example, is configured of a guide member guiding the colorimetric unit 3, a feeding mechanism moving the colorimetric unit 3 by being guided by the guide member, such as rack-and-pinion or a feed screw, and a feeding mechanism driving unit driving the feeding mechanism, such as the stepping motor (the main scanning stepping motor). For example, as illustrated in FIG. 3, the main scanning direction moving unit 4 includes a rack 31 which extends along the main scanning direction and is formed by gear cutting a flat plate-like rod, and a pinion (not illustrated) which is disposed in the colorimetric unit 3, for example, and is rotatively driven by the main scanning stepping motor, and thus, the pinion engages with the rack 31. In the main scanning direction moving unit 4 having such a configuration, a driving pulse of 1 pulse (a first driving pulse, an example of the first unit conveyance instruction) is input, and thus, the main scanning stepping motor is rotated by a predetermined angle (an eleventh angle), the pinion is also rotated by a predetermined angle (a twelfth angle) according to the rotation of the main scanning stepping motor, and then, the colorimetric unit 3 is moved in the main scanning direction by a predetermined amount along the rack 31, according to the rotation of the pinion.

The imaging unit 5 is a device which is connected to the control processing unit 6, and images an optical image of the object, according to the control of the control processing unit 6. The imaging unit 5, for example, is configured of a line sensor (a linear image sensor) or the like, in which a plurality of photoelectric conversion elements are arranged along one direction, and as illustrated in FIG. 3, and is disposed to extend along the main scanning direction (the X direction) by allowing the one direction, which is an arrangement direction of the plurality of photoelectric conversion elements, to be coincident with the main scanning direction (the X direction).

As illustrated in FIG. 2, such an imaging unit 5 is disposed between the first sheet conveyance roller portion 20-1 and the second sheet conveyance roller portion 20-2, and the colorimetric unit 3 and the main scanning direction moving unit 4 are disposed such that the colorimetric unit 3 is moved along the main scanning direction between the second sheet conveyance roller portion 20-2 and the third sheet conveyance roller portion 20-3. The imaging unit 5 images the sheet of the object to be measured for each line along the main scanning direction (the X direction) while conveying the sheet of the object to be measured in the sub-scanning direction (the Y direction) by the sub-scanning direction moving unit 2, and thus, generates an image (the image data) of the sheet of the object to be measured. The sheet of the object to be measured is conveyed in the sub-scanning direction (the Y direction) by the sub-scanning direction moving unit 2, and thus, a relative position Y between the sheet of the object to be measured and the colorimetric unit 3 in the sub-scanning direction can be changed, and the colorimetric unit 3 itself is moved in the main scanning direction (the X direction) by the main scanning direction moving unit 4, and thus, a relative position X between the sheet of the object to be measured and the colorimetric unit 3 in the main scanning direction can be changed. Accordingly, the colorimetric unit 3 is capable of being moved to an arbitrary position (X, Y) on the sheet of the object to be measured, and of measuring the color of the position (X, Y).

Thus, in this embodiment, the colorimetric unit 3 can be moved only in the main scanning direction by the main scanning direction moving unit 4, with respect to the sheet of the object to be measured. On the other hand, the movement of the sheet of the object to be measured along the sub-scanning direction is executed by the sub-scanning direction moving unit (the sheet conveyance unit) 2. Therefore, in this embodiment, the main scanning direction moving unit 4 and the sub-scanning direction moving unit 2 correspond to an example of a moving unit relatively moving the position of the colorimetric unit with respect to the sheet of the object to be measured.

The input unit 7 is a device which is connected to the control processing unit 6, and inputs, for example, various commands such as a command of instructing the colorimetry of the object to be measured, and for example, various data items required for the colorimetry, such as the input or the like of an identifier of the object to be measured, to the colorimetric device CM, and examples of the input unit 7 include a plurality of input switches or the like, to which a predetermined function is allocated. The output unit 8 is a device which is connected to the control processing unit 6, and outputs the command or the data input from the input unit 7, and the color of the object to be measured, which is measured by the colorimetric device CM, according to the control of the control processing unit 6, and examples of the output unit 8 include a display device such as a CRT display, an LCD, and an organic EL display, a printing device such as a printer, and the like.

Furthermore, a touch panel may be configured of the input unit 7 and the output unit 8. In a case of configuring the touch panel, the input unit 7, for example, is a position input device which detects and inputs an operation position of a resistance system, an electrostatic capacitance system, or the like, and the output unit 8 is a display device. In the touch panel, the position input device is disposed on a display surface of the display device, candidates of one or a plurality of input contents which can be input are displayed on the display device, and in a case where a user touches a display position in which input contents to be input are displayed, the position is detected by the position input device, and the display contents displayed on the detected position is input into the colorimetric device CM as operation input contents of the user. In such a touch panel, the user easily intuitively understands an input operation, and thus, the colorimetric device CM which is easily handled by the user is provided.

The IF unit 9 is a circuit which is connected to the control processing unit 6, and inputs and outputs data with respect to an external device, according to the control of the control processing unit 6, and examples of the IF unit 9 include an interface circuit of RS-232C, which is a serial communication system, an interface circuit using Bluetooth (Registered Trademark) standard, an interface circuit performing infrared light communication of infrared data association (IrDA) standard or the like, an interface circuit using universal serial bus (USB) standard, and the like.

The storage unit 10 is a circuit which is connected to the control processing unit 6, and stores various predetermined programs and various predetermined data items, according to the control of the control processing unit 6. The various predetermined programs, for example, include a control processing program such as a colorimetric program for performing the colorimetry with respect to the object to be measured, a chart region detection program for obtaining a chart region of the color chart CT in a case where the object to be measured is the color chart CT, and a position measurement program for obtaining each position of each of the patches in the color chart CT in a case where the object to be measured is the color chart CT. The various predetermined data items include a plurality of arrangement patterns of the chart region in the color chart, and include data or the like which is required for executing each of the programs of chart definition information describing predetermined attribute information relevant to the patch. The chart definition information includes at least patch position definition information representing each of the positions of the plurality of patches. Preferably, the patch position definition information is a local coordinate value of the position of the patch in a chart local coordinate system in which a specific point set in advance in the color chart CT, for example, the upper left vertex (the upper left edge) of the color chart CT in the plan view is set to a local coordinate origin. Furthermore, in a case where the color chart CT includes a plurality of chart regions, the patch position definition information is prepared for each of the chart regions. In addition, preferably, the chart definition information further includes patch quantity definition information representing the number of plurality of patches. The patch quantity definition information may be directly represented by a numerical value itself which represents the number of plurality of patches, or may be indirectly represented by the number of patch position definition information items (that is, in this case, the control processing unit 6 counts the number of patch position definition information items, and thus, the number of patches is obtained). In addition, preferably, the chart definition information further includes chart region frame definition information representing a frame of the chart region in which the plurality of patches exist. The chart region frame definition information is data in which a closed loop can be drawn by the chart region frame definition information such as a coordinate value of each vertex in the frame (an outer contour) of the chart region, coordinate values of both endpoints of a diagonal line segment, a coordinate value of a center point, and a length of a radius (as necessary, a center angle). In addition, preferably, the chart definition information further includes patch color definition information representing the colors of each of the plurality of patches. The patch color definition information is a color coordinate value of a suitable color coordinate system. The storage unit 10 functionally includes a pattern storage unit 101 storing the plurality of arrangement patterns, and a chart definition information storage unit 102 storing the chart definition information. Such a storage unit 10, for example, includes a read only memory (ROM) which is a non-volatile storage element, an electrically erasable programmable read only memory (EEPROM) which is a rewritable non-volatile storage element, or the like. Then, the storage unit 10 includes a random access memory (RAM) or the like, which becomes a working memory of a so-called control processing unit 6 storing data or the like generated during the execution of the predetermined program.

The control processing unit 6 is a circuit for obtaining the color of the object to be measured by controlling each unit of the colorimetric device CM according to the functions of each of the units. The control processing unit 6, for example, is configured of a central processing unit (CPU) and a peripheral circuit thereof. In the control processing unit 6, the control processing program is executed, and thus, a control unit 61, an image acquisition processing unit 62, a pattern determination processing unit 63, a chart region detection processing unit 64, a patch position processing unit 65, a patch position correction processing unit 66 (66a to 66d), and a color measurement processing unit 67 are functionally configured.

The control unit 61 is for controlling each of the units of the colorimetric device CM according to the functions of each of the units.

The image acquisition processing unit 62, for example, acquires the image of the sheet of the object to be measured, which is the color chart CT or the like, by the imaging unit 5. More specifically, in this embodiment, the imaging unit 5 is configured of a line sensor or the like, and thus, the image acquisition processing unit 62, for example, acquires the image of the sheet of the object to be measured by imaging the sheet of the object to be measured, which is the color chart CT or the like, by the imaging unit 5 while conveying the sheet of the object to be measured by the sub-scanning direction moving unit (the sheet conveyance unit) 2.

The pattern determination processing unit 63 determines the arrangement pattern corresponding to the color chart CT, which is acquired in the image acquisition processing unit 62, from the plurality of arrangement patterns stored in the pattern storage unit 101, on the basis of the image of the color chart CT, which is acquired in the image acquisition processing unit 62. More specifically, the pattern determination processing unit 63 detects a predetermined optical characteristic amount or a predetermined geometric characteristic amount from the image of the color chart CT, which is acquired in the image acquisition processing unit 62, and determines the arrangement pattern corresponding to the color chart CT, which is acquired in the image acquisition processing unit 62, from the plurality of arrangement patterns stored in the pattern storage unit 101, on the basis of the detected characteristic amount.

It is preferable that such a pattern determination processing unit 63 detects a candidate region which becomes a candidate of the chart region, from the image of the color chart CT acquired in the image acquisition processing unit 62, and detects a circumscribed rectangular shape of the detected candidate region as the predetermined geometric characteristic amount, on one surface. It is preferable that such a pattern determination processing unit 63 detects the candidate region which becomes the candidate of the chart region, from the image of the color chart CT acquired in the image acquisition processing unit 62, and detects the area of the detected candidate region as the predetermined geometric characteristic amount, on the other surface. Such a colorimetric device CM compares the area of the detected candidate region with a minimum patch area set in advance, and thus, is capable of determining whether or not the candidate region is a patch. For example, the color chart CTa of the first aspect illustrated in FIG. 9A has a first arrangement pattern in which a plurality of patches are arranged in random (arbitrary) color arrangement such that a circumscribed figure (an outline figure) of one chart region formed of the plurality of patches is in the shape of a quadrangle, and the pattern determination processing unit 63 is capable of determining that the color chart CTa of the first aspect is the first arrangement pattern by the processing described above. Then, the colorimetric device CM is capable of determining an inside region of the circumscribed figure as the chart region.

It is preferable that the candidate region, which becomes the candidate of the chart region, is detected from the image of the color chart CT acquired in the image acquisition processing unit 62, and a histogram of the density of the detected candidate region is detected as the predetermined optical characteristic amount, on the other surface. In such a colorimetric device CM, the histogram of the density is used, and thus, a position detection bar or a row position detection marker representing the position of the chart region can be detected. For this reason, in such a colorimetric device CM, the detected position detection bar or row position detection marker is used, and thus, a patch region can be more suitably determined. For example, the color chart CTb of the second aspect illustrated in FIG. 9B includes a plurality of patches which are arranged in color arrangement of a gradation such that a circumscribed figure (an outline figure) of one chart region is in the shape of a quadrangle. Then, the color chart CTb of the second aspect has a second arrangement pattern which includes a width position detection bar (an example of a position detection code) in the shape of a black rod, representing the width of the chart region along the main scanning direction, on the outside of the chart region, along one lateral surface of the chart region (in an example illustrated in FIG. 9B, an upper side lateral surface on the paper plane), and a row position detection marker (another example of the position detection code) in the shape of a black rhombus, representing the position of each row of the patch in the sub-scanning direction, on the outside of the chart region, along each of lateral surfaces of the chart region, facing each other (in the example illustrated in FIG. 9B, right and left both lateral surfaces on the paper plane), respectively. That is, in the second arrangement pattern, the respective patches can be arranged in the inside region surrounded by the width position detection bar and each of the row position detection markers. The pattern determination processing unit 63 is capable of determining that the color chart CTb of the second aspect is the second arrangement pattern by the processing described above. Then, the colorimetric device CM detects the width position detection bar and each of the row position detection markers, and thus, is capable of detecting the inside region as the chart region.

It is preferable that such a pattern determination processing unit 63 detects the candidate region which becomes the candidate of the chart region, from the image of the color chart CT acquired in the image acquisition processing unit 62, and detects an aspect ratio of the detected candidate region as the predetermined geometric characteristic amount, on the other surface. In such a colorimetric device CM, the detected aspect ratio is used, and thus, it is possible to determine that the chart region is an elongated arrangement pattern (for example, a horizontally long arrangement pattern, a vertically long arrangement pattern, or the like) along one side. For example, the color chart CTc of the third aspect illustrated in FIG. 9C includes a plurality of patches which are arranged in color arrangement of a gradation such that a circumscribed figure (an outline figure) of one chart region is in the shape of a quadrangle. Then, the color chart CTc of the third aspect has a third arrangement pattern in which the plurality of patches are arranged such that the patch region is elongated in comparatively one direction. The pattern determination processing unit 63 is capable of determining that such a color chart CTc of the third aspect is the third arrangement pattern by the processing described above. Then, the colorimetric device CM is capable of detecting the inside region from an end portion patch positioned in one end portion of the chart region to an end portion patch positioned in the other end portion as the chart region.

It is preferable that such a pattern determination processing unit 63 detects candidate region which becomes the candidate of the chart region, from the image of the color chart CT acquired in the image acquisition processing unit 62, and further detects at least any one of the area of the detected candidate region, and a vertical length and a horizontal length of the candidate region as the predetermined geometric characteristic amount, on the other surface. Such a colorimetric device CM compares the area of the detected candidate region with the minimum patch area set in advance, and thus, is capable of determining whether or not the candidate region is the patch, and in a case where it is determined that the candidate region is not the patch, the colorimetric device CM is capable of determining at least one of whether or not the candidate region is a gap between the patches and whether or not the candidate region is an end portion marker (for example, a hook (L) or the like) representing the end portion of the patch region. For example, the color charts CTd and CTe of the fourth aspect and the fifth aspect illustrated in FIG. 10A and FIG. 10B include a plurality of patches which are arranged in color arrangement of a gradation such that a circumscribed figure (an outline figure) of one chart region is in the shape of an elongated quadrangle on one side. Then, in the color chart CTed of the fourth aspect, the respective patches are arranged at a comparatively narrow gap (interval). That is, in the color chart CTd of the fourth aspect, an end portion patch is disposed on the outside of a gap (an end portion gap) positioned in an end portion, and the end portion gap represents the vicinity of the end portion of the patch region. The color chart CTe of the fifth aspect, for example, includes an end portion marker such as a hook mark (an L shape). That is, in the color chart CTe of the fifth aspect, the end portion marker represents the end portion of the patch region. The pattern determination processing unit 63 is capable of determining that the color chart CTd of the fourth aspect or the color chart CTe of the fifth aspect is such an arrangement pattern (a fourth arrangement pattern) by the processing described above. Then, the colorimetric device CM detects any one of the end portion gap and the end portion marker, and thus, the colorimetric device CM is capable of determining the inside region from any one of the end portion gap and the end portion marker positioned on one side to any one of the end portion gap and the end portion marker positioned on the other side as the patch region.

The chart region detection processing unit 64 detects the chart region from the image of the color chart CT which is acquired in the image acquisition processing unit 62, on the basis of the arrangement pattern determined in the pattern determination processing unit 63.

It is preferable that the pattern determination processing unit 63 described above detects the candidate region which becomes the candidate of the chart region, from the image of the color chart CT acquired in the image acquisition processing unit 62, and detects at least one of the patch, the gap between the patches, and the end portion marker, representing the end portion of the chart region, as the predetermined geometric characteristic amount, from the detected candidate region, and the chart region detection processing unit 64 detects the chart region from the image of the color chart CT acquired in the image acquisition processing unit 62 on the basis of at least one of the patch, the gap between the patches, and the end portion marker, detected in the pattern determination processing unit 63, and the arrangement pattern determined in the pattern determination processing unit 63, on the other surface. In such a colorimetric device CM, at least one of the patch representing the end portion of the chart region, the gap between the patches representing the end portion of the chart region, and the end portion marker representing the end portion of the chart region is detected as the predetermined geometric characteristic amount, and the detected geometric characteristic amount is used for detecting the chart region, and thus, for example, even in a case where the color of the patch is close to a ground color of the paper, and thus, the end portion of the chart region is rarely detected, it is possible to more suitably determine the chart region.

It is preferable that the pattern determination processing unit 63 described above detects the candidate region which becomes the candidate of the chart region, from the image of the color chart CT acquired in the image acquisition processing unit 62, and detects the area of the detected candidate region as the predetermined geometric characteristic amount, and the chart region detection processing unit 64 detects the chart region from the image of the color chart CT acquired in the image acquisition processing unit 62 on the basis of the area of the candidate region detected in the pattern determination processing unit 63 and the arrangement pattern determined in the pattern determination processing unit 63, on the other surface. In such a colorimetric device CM, the area of the candidate region is also used for determining the chart region, and thus, for example, it is possible to determine an isolated patch, and to more suitably determine the patch region by matching the isolated patch. For example, the color chart CTf of the sixth aspect illustrated in FIG. 10C includes a plurality of patches which are arranged in color arrangement of a gradation such that a circumscribed figure (an outline figure) of one chart region is in the shape of a quadrangle. The color chart CTf of the sixth aspect has a fifth arrangement pattern in which the respective patches are arranged by being comparatively separated from each other, and the respective patches are isolated from each other. In the fifth arrangement pattern, the isolated patch or a hook region (the end portion marker) positioned around each of the isolated patches can be matched, and the matched region can be detected as the patch region.

The patch position processing unit 65 obtains patch position measurement information (that is, the position of the patch) representing the position of the patch, with respect to each of the plurality of patches in the chart region, from the image of the color chart CT acquired in the image acquisition processing unit 62, on the basis of the chart region detected in the chart region detection processing unit 64. More specifically, the patch position processing unit 65 performs binarization processing with respect to the image of the color chart CT, for example, by using an edge filter which is used for detecting the edge of the image extending in one direction, in the chart region, and thus, generates binarized horizontal edge image data and binarized vertical edge image data in each of the horizontal direction (the main scanning direction, the X direction) and the vertical direction (the sub-scanning direction, the Y direction), performs Hough transform with respect to each of the generated binarized horizontal edge image data and binarized vertical edge image data, and thus, detects a horizontal edge line and a vertical edge line in each of the horizontal direction and the vertical direction, sets each intersection point on each medium line thereof to each position of each patch, and obtains each coordinate value (world coordinate value) of each of the intersection points as each of the patch position measurement information items.

The patch position correction processing unit 66 obtains the patch position correction information by correcting the patch position measurement information obtained in the patch position processing unit 65, on the basis of the chart definition information stored in the chart definition information storage unit 102. That is, the patch position correction processing unit 66 corrects each of the positions of each of the patches obtained in the patch position processing unit 65 by using the chart definition information, and obtains each of the corrected positions of each of the patches.

As illustrated in FIG. 5, such a patch position correction processing unit 66 is the patch position correction processing unit 66a of the first aspect including a local coordinate origin detection processing unit 661a, a coordinate correction processing unit 662a, and a first position correction processing unit 663a, on one surface. In this case, the patch position definition information is local coordinate values (x, y) in a chart local coordinate system xy in which a specific point set in advance in the color chart CT is set to a local coordinate origin $po_0$ (refer to FIG. 19). The local coordinate origin detection processing unit 661a detects the local coordinate origin $po_0$ from the image of the color chart CT acquired in the image acquisition processing unit 62. The coordinate correction processing unit 662a obtains patch position coordinate correction information (xp+Δx, yp+Δy; Δx and Δy are a deviation amount between the world coordinate origin $PO_0$ and the local coordinate origin $po_0$) by correcting patch position definition information (xp, yp) included in the chart definition information which is stored in the chart definition information storage unit 102, on the basis of the local coordinate origin $po_0$ detected in the local coordinate origin detection processing unit 661a. Accordingly, the patch position coordinate correction information is patch position definition information represented by coordinate values (Xp, Yp) (Xp=x+Δx, Yp=y+Δy) in the world coordinate system XY. The first position correction processing unit 663a obtains the patch position correction information by correcting the patch position measurement information obtained in the patch position processing unit 65, on the basis of the patch position coordinate correction information obtained by being corrected in the coordinate correction processing unit 662a.

As illustrated in FIG. 6, such a patch position correction processing unit 66 is the patch position correction processing unit 66b of the second aspect including a patch quantity detection processing unit 661b, a patch quantity comparison processing unit 662b, a second position correction processing unit 663b, and a third position correction processing unit 664b, on one surface. In this case, the chart definition information includes the patch quantity definition information. The patch quantity detection processing unit 661b obtains patch quantity measurement information representing the number of patches which is obtained from the image of the color chart CT on the basis of the patch position measurement information obtained in the patch position processing unit 65. The patch quantity comparison processing unit 662b compares the number of patches represented by the patch quantity definition information included in the chart definition information which is stored in the chart definition information storage unit 102 with the number of patches represented by the patch quantity measurement information obtained in the patch quantity detection processing unit 661b. As a result of performing the comparison in the patch quantity comparison processing unit 662b, the second position correction processing unit 663b obtains patch position correction information by supplementing patch position non-detection information representing the position of an undetected patch, in a case where the number of patches represented by the patch quantity measurement information is less than the number of patches represented by the patch quantity definition information. As a result of performing the comparison in the patch quantity comparison processing unit 662b, the third position correction processing unit 664b obtains the patch position correction information by deleting patch position false detection information representing the position of the patch erroneously detected, in a case where the number of patches represented by the patch quantity measurement information is greater than the number of patches represented by the patch quantity definition information. Here, preferably, the third position correction processing unit 664b sets the patch position measurement information of the patch to the patch position false detection information, in a case where the position of the patch which is represented by the patch position measurement information obtained in the patch position processing unit 65 is positioned out of the frame represented by the chart region frame definition information included in the chart definition information which is stored in the chart definition information storage unit 102. In this case, the chart definition information includes the chart region frame definition information representing the frame of the chart region.

As illustrated in FIG. 7, such a patch position correction processing unit 66 is the patch position correction processing unit 66c of the fourth aspect including a fourth position correction processing unit 661c, on one surface. In this case, the color chart CT includes a plurality of chart regions. The fourth position correction processing unit 661c obtains the patch position correction information in at least any one chart region of residual chart regions of the plurality of chart regions, on the basis of the patch position measurement information obtained in the patch position processing unit 65, in any one chart region of the plurality of chart regions.

As illustrated in FIG. 8, such a patch position correction processing unit 66 is the patch position correction processing unit 66d of the fourth aspect including a patch color detection processing unit 661d, a patch color comparison processing unit 662d, a chart arrangement direction detection processing unit 663d, and a fifth position correction processing unit 664d, on one surface. In this case, the chart definition information includes the patch color definition information representing the colors of each of the plurality of patches. The patch color detection processing unit 661d obtains the color of the patch positioned in a specific position set in advance, in the plurality of patches, as specific position patch color measurement information, from the image of the color chart CT acquired in the image acquisition processing unit 62. The patch color comparison processing unit 662d compares the color of the patch represented by the patch color definition information of the patch positioned in the specific position, included in the chart definition information which is stored in the chart definition information storage unit 102, with the color of the patch obtained in the patch color detection processing unit 661d. The chart arrangement direction detection processing unit 663d obtains an arrangement direction of the color chart CT on the basis of the result of performing comparison in the patch color comparison processing unit 662d. The fifth position correction processing unit 664d obtains the patch position correction information by correcting the patch position measurement information obtained in the patch position processing unit 65 on the basis of the arrangement direction of the color chart CT which is obtained in the chart arrangement direction detection processing unit 663d.

The color measurement processing unit 67 relatively moves the position of the colorimetric unit 3 with respect to the color chart CT to each of the positions of the plurality of patches represented by the patch position correction information which is obtained in the patch position correction processing unit 66, by the sub-scanning direction moving unit 2 and the main scanning direction moving unit 4, and measures the colors of each of the plurality of patches by the colorimetric unit 3.

Figure 11:
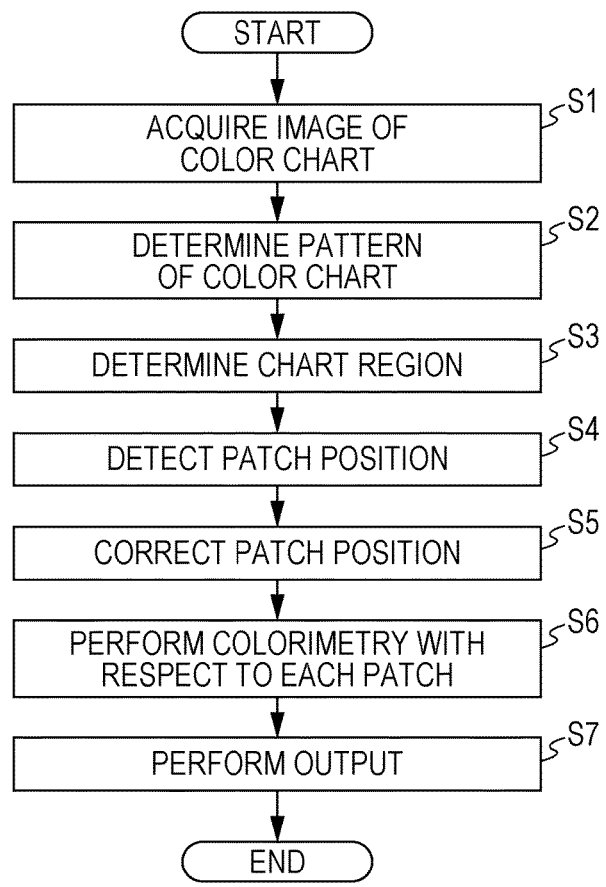
FIG. 11 is a flowchart illustrating a schematic operation of the colorimetric device of the embodiment.
Figure 12:
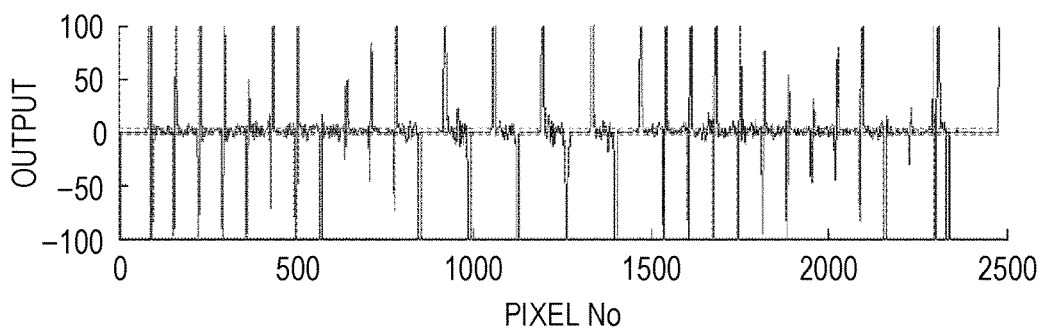
FIG. 12 is a diagram illustrating an example of a processing result of processing an image in a certain position in a Y direction by a difference filter at an N point of a difference interval along a horizontal direction, with respect to the color chart illustrated in FIG. 9A.
Figure 13:
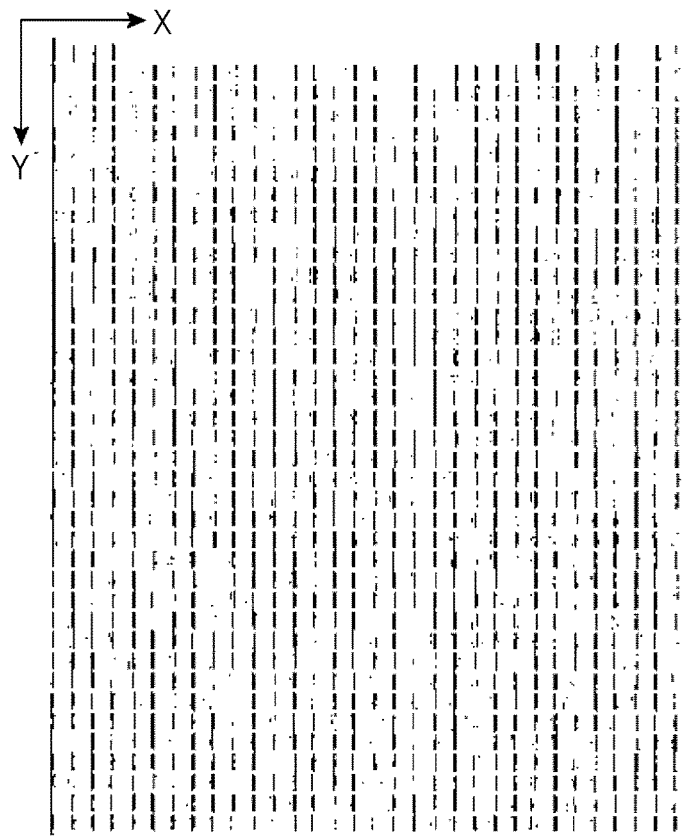
FIG. 13 is a diagram illustrating a binarized vertical edge image of the color chart, as an example.
Figure 14:
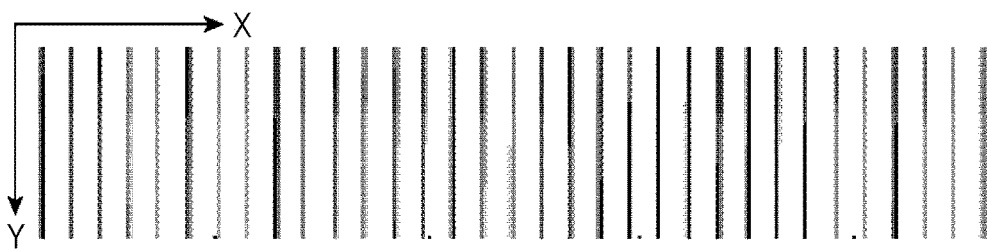
FIG. 14 is a diagram illustrating a part of a vertical edge line of the color chart, as an example.
Figure 15:
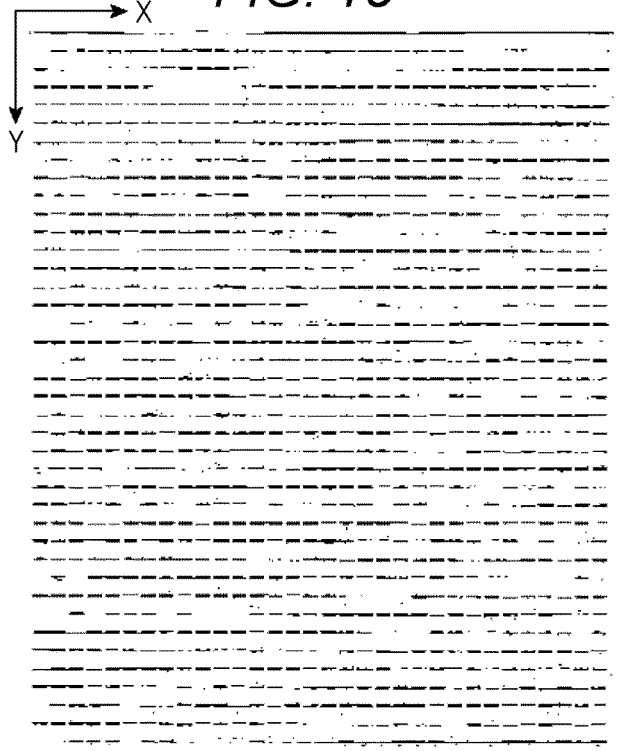
FIG. 15 is a diagram illustrating a binarized horizontal edge image of the color chart, as an example.
Figure 16:
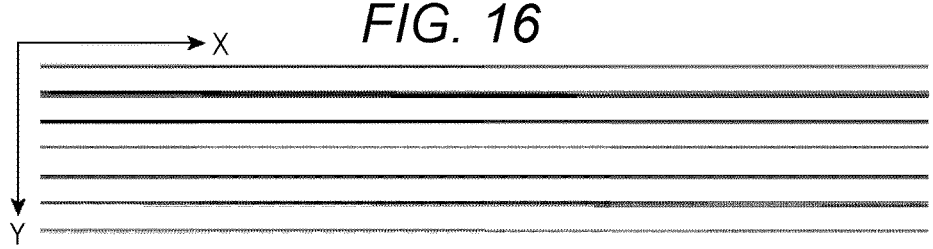
FIG. 16 is a diagram illustrating a part of a horizontal edge line of the color chart, as an example.
Figure 17:
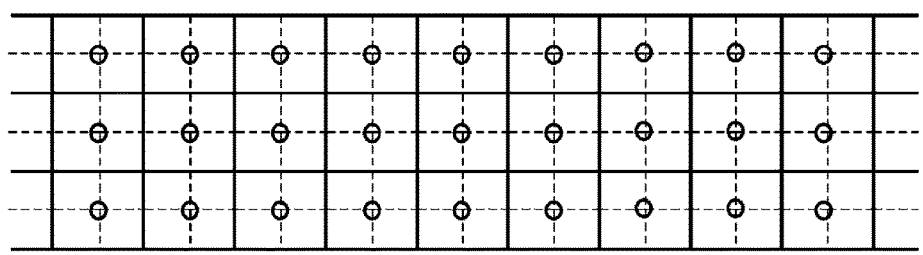
FIG. 17 is a diagram illustrating a part of the position of each patch obtained from the vertical edge line and the horizontal edge line of the color chart, as an example.

Next, the operation of the colorimetric device of this embodiment will be described. FIG. 11 is a flowchart illustrating a schematic operation of the colorimetric device of the embodiment. FIG. 12 is a diagram illustrating an example of a processing result of processing an image in a certain position in the Y direction by a difference filter at an N point of a difference interval along the horizontal direction, with respect to the color chart illustrated in FIG. 9A. FIG. 13 is a diagram illustrating a binarized vertical edge image of the color chart, as an example. FIG. 14 is a diagram illustrating apart of a vertical edge line of the color chart, as an example. FIG. 15 is a diagram illustrating a binarized horizontal edge image of the color chart, as an example. FIG. 16 is a diagram illustrating a part of a horizontal edge line of the color chart, as an example. FIG. 17 is a diagram illustrating a part of the position of each patch obtained from the vertical edge line and the horizontal edge line of the color chart, as an example. In FIG. 17, a solid line represents the vertical edge line or the horizontal edge line, a broken line represents the medium line between the vertical edge lines or the medium line between the horizontal edge lines, and o represents the actually measured positions of each of the patches (actually measured patch positions).

In a case where each of the patches of the color chart CT is subjected to the colorimetry, the colorimetric device CM of this embodiment is approximately operated as follow. In a case where the color chart CT is set in the paper feeding unit 1, and the start of the colorimetry of the color chart CT is instructed from the input unit 7, as illustrated in FIG. 11, first, the colorimetric device CM, for example, acquires the entire image of the color chart CT in the forward conveyance by the image acquisition processing unit 62 (S1). More specifically, the image acquisition processing unit 62 of the control processing unit 6 conveys the color chart CT from one end to the other end of the paper of the color chart CT in the sub-scanning direction (the Y direction), in the forward conveyance by the sub-scanning direction moving unit 2, images the color chart CT for each line along the main scanning direction (the X direction) by the imaging unit 5 in synchronization with the conveyance in the sub-scanning direction, and acquires the entire image of the color chart CT.

Next, as described above, the colorimetric device CM determines the arrangement pattern with respect to the color chart CT acquired in the image acquisition processing unit 62 from the plurality of arrangement patterns stored in the pattern storage unit 101, by the pattern determination processing unit 63, on the basis of the image of the color chart CT acquired in the image acquisition processing unit 62 (S2, a pattern determination processing step). For example, the pattern determination processing unit 63 performs binarization with respect to the image of the color chart CT acquired in the image acquisition processing unit 62 by using a predetermined brightness as a threshold value, and subsequently, eliminates a noise, and after that, calculates a circumscribed rectangle of the candidate region (a label (an identifier ID)) of the chart region which is greater than or equal to the minimum patch area set in advance as a minimum area of the patch, and then, determines the arrangement pattern of the color chart CT acquired by the image acquisition processing unit 62 according to the various methods described above.

Next, the colorimetric device CM detects the chart region from the image of the color chart CT acquired in the image acquisition processing unit 62 by the chart region detection processing unit 64, on the basis of the arrangement pattern determined in the pattern determination processing unit 63, and stores the detection result in the storage unit 10 (S3, a chart region detection processing step). The chart region is a region of one group of patches in which a plurality of patches exist by being comparatively bound as one.

Next, the colorimetric device CM obtains the patch position measurement information (the position of the patch) representing the position of the patch, with respect to each of the plurality of patches, from the image of the color chart CT acquired in the image acquisition processing unit 62, on the basis of the chart region detected in the chart region detection processing unit 64, and stores the obtained patch position measurement information in the storage unit 10 (S4, a patch position processing step). For example, the patch position processing unit 65 detects a vertical edge along the vertical direction (the Y direction) by using a predetermined edge filter for detecting a vertical edge and a horizontal edge along the horizontal direction (the X direction) by using a predetermined edge filter for detecting a horizontal edge, on the basis of the entire image of the color chart CT acquired in the image acquisition processing unit 62. FIG. 12 illustrates the example of the processing result of processing the image of the certain position in the Y direction by the difference filter at the N point of the difference interval along the X direction, with respect to the color chart illustrated in FIG. 9A. Subsequently, in the patch position processing unit 65, an absolute value of the vertical edge after edge filter processing is obtained, the obtained absolute value is compared with a threshold value set in advance and is subjected to binarization, and image data of a binarized vertical edge is generated. For example, in a case where a processing result after edge filter processing is subjected to the binarization, for example, image data of the binarized vertical edge image illustrated in FIG. 13 is generated, with respect to the image of the color chart CTa illustrated in FIG. 9A. Similarly, in the patch position processing unit 65, an absolute value of the horizontal edge after the edge filter processing is obtained, the obtained absolute value is compared with a threshold value set in advance and is subjected to the binarization, and image data of a binarized horizontal edge is generated. For example, in a case where a processing result after the edge filter processing is subjected to the binarization, for example, image data of the binarized horizontal edge image illustrated in FIG. 15 is generated, with respect to the image of the color chart CTa illustrated in FIG. 9A. Subsequently, the patch position processing unit 65 performs Hough transform with respect to each of the image data of the binarized vertical edge and the image data of the binarized horizontal edge of the color chart CT, and detects each of the vertical edge line and the horizontal edge line. For example, in a case where the image data of the binarized vertical edge of the color chart CTa illustrated in FIG. 13 is subjected to the Hough transform, for example, the vertical edge line illustrated in FIG. 14 is detected. In addition, in a case where the image data of the binarized horizontal edge of the color chart CTa illustrated in FIG. 15 is subjected to the Hough transform, for example, the horizontal edge line illustrated in FIG. 16 is detected. Then, the patch position processing unit 65 obtains a vertical medium line which is a medium line between the vertical edge lines adjacent to each other, in each of a plurality of vertical edge lines, and similarly, obtains a horizontal medium line which is a medium line between the horizontal edge lines adjacent to each other, in each of a plurality of horizontal edge lines, and then, obtains each intersection point between the plurality of obtained vertical medium lines and the plurality of obtained horizontal medium lines as the positions (X, Y) of each of the patches. For example, in a case where the vertical medium line is obtained on the basis of the vertical edge line obtained with respect to the color chart CTa illustrated in FIG. 9A, the vertical medium line illustrated by a broken line in FIG. 17 is obtained, in a case where the horizontal medium line is obtained on the basis of the horizontal edge line, the horizontal medium line illustrated by the broken line in FIG. 17 is obtained, and then, each of the intersection points is obtained as each of the positions (X, Y) of each of the patches as illustrated by a mark of ○ in FIG. 17. In this embodiment, each of the positions (X, Y) of each of the patches is the patch position measurement information.

Next, the colorimetric device CM obtains the patch position correction information by correcting the patch position measurement information obtained in the patch position processing unit 65, on the basis of the chart definition information stored in the chart definition information storage unit 102, and stores the obtained patch position correction information in the storage unit 10 (S5, a patch position correction processing step). The patch position correction processing step will be described below in detail.

Then, in a case where the plurality of patches are subjected to the colorimetry in each of the positions of the plurality of patches obtained as described above, in the colorimetric device CM, the color measurement processing unit 67 relatively moves the position of the colorimetric unit 3 with respect to the color chart CT to each of the positions of the plurality of patches represented by the patch position correction information which is obtained in the patch position correction processing unit 66, by the sub-scanning direction moving unit 2 and the main scanning direction moving unit 4, measures the colors of each of the plurality of patches by the colorimetric unit 3, and stores the measurement result in the storage unit 10 (S6, a colorimetric processing step).

Then, in the colorimetric device CM, in a case where the final patch is subjected to the colorimetry by the color measurement processing unit 67, the control unit 61 of the control processing unit 6 outputs each of the measured colors of each of the patches to the output unit 8, and allows the processing to end (S7). Furthermore, as necessary, the control unit 61 of the control processing unit 6 may output each of the measured colors of each of the patches to the IF unit 9.

Next, the patch position correction processing step S5 described above will be described below in more detail. The patch position correction processing step S5 is executed by any one of the patch position correction processing steps of the first aspect to the fourth aspect described below or a plurality of combinations thereof.

(Patch Position Correction Processing Step of First Aspect)

Figure 18:
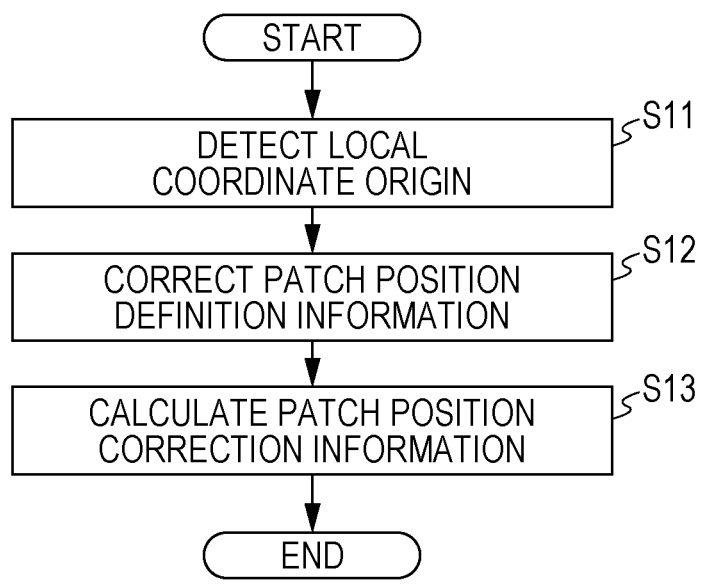
FIG. 18 is a flowchart illustrating an operation of the patch position correction processing unit of the first aspect.
Figure 19:
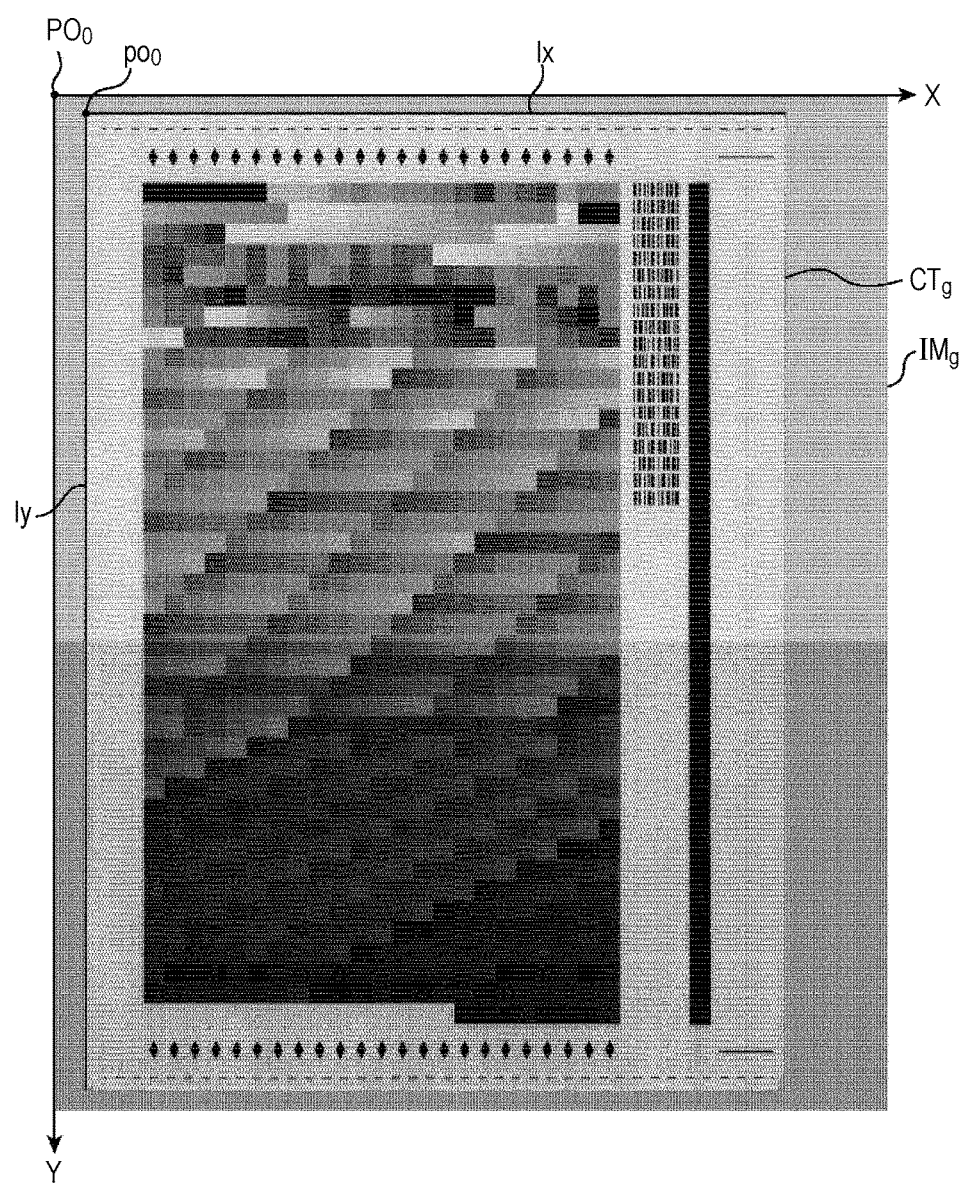
FIG. 19 is a diagram for illustrating the operation of the patch position correction processing unit of the first aspect.

FIG. 18 is a flowchart illustrating the operation of the patch position correction processing unit of the first aspect. FIG. 19 is a diagram for illustrating the operation of the patch position correction processing unit of the first aspect.

In a case where the patch position correction processing step of the first aspect is executed, the colorimetric device CM is configured of the patch position correction processing unit 66a described above, illustrated in FIG. 5.

In FIG. 18, in the patch position correction processing step of the first aspect, first, the local coordinate origin detection processing unit 661a detects the local coordinate origin $po_0$ from the image of the color chart CT acquired in the image acquisition processing unit 62, and acquires coordinate values $(X_0, Y_0)$ in the world coordinate system XY (S11). The world coordinate system XY is an XY orthogonal coordinate system in which a predetermined position set in advance in the image imaged by the imaging unit 5 is set to the coordinate origin (the world coordinate origin). For example, in an example illustrated in FIG. 19, the world coordinate system XY is set to include a world coordinate origin $PO_0$ (0, 0) which is set on an upper left vertex (an upper left edge) of the image in the plan view in the image of the color chart CTg imaged by the imaging unit 5, an X axis along the X direction of the main scanning direction, and a Y axis along the Y direction of the sub-scanning direction orthogonal to the main scanning direction.

More specifically, the local coordinate origin $po_0$ $(X_0, Y_0)$ in the world coordinate system XY set as described above, is detected as follow. That is, the local coordinate origin $po_0$ $(X_0, Y_0)$ is set on the upper left vertex of the color chart CT, and thus, as illustrated in FIG. 19, can be detected by detecting the contour of the portion of the chart region (a chart region portion) from an image (an entire image) IMg of the color chart CTg, and by detecting an upper left vertex of the contour. For this reason, the local coordinate origin detection processing unit 661a, first, performs image processing with respect to the image of the color chart CT acquired in the image acquisition processing unit 62 by using a known image filter detecting the contour (the edge), and thus, detects the contour of the chart region portion obtained by imaging the chart region, from the image IMg of the color chart CTg. Various filters are known as the known image filter, and examples of the filter include an image filter such as a Sobel filter, a Prewitt filter, and a Canny filter. The Sobel filter is a filter which calculates a first derivation of a space, and extracts a portion in which a change occurs in the image, as an example. The local coordinate origin detection processing unit 661a performs image processing by using a Sobel filter of Formula 1, from an upper end line (a line segment of X=0) in the plan view in the image IMg of the color chart CTg to a lower direction (from Y=0 to a maximum value of Y) in the plan view along the Y axis. Accordingly, in the image IMg of the color chart CTg, an upper end line 1x of the contour of the chart region portion is detected. The local coordinate origin detection processing unit 661a performs the image processing by using a Sobel filter of Formula 2, from a left end line (a line segment of Y=0) in the plan view in the image IMg of the color chart CTg to a right direction (from X=0 to a maximum value of X) in the plan view along the X axis. Accordingly, in the image IMg of the color chart CTg, a left end line 1y of the contour of the chart region portion is detected. Then, the local coordinate origin detection processing unit 661a obtains an intersection point between the upper end line 1x and the left end line 1y, which are detected by the processing. The intersection point is the local coordinate origin $po_0$ $(X_0, Y_0)$ in the world coordinate system XY, and thus, the local coordinate origin $po_0$ $(X_0, Y_0)$ in the world coordinate system XY is obtained.

[Formula 1]

$$\begin{pmatrix} 1 & 2 & 1 \\ 0 & 0 & 0 \\ -1 & -1 & -1 \end{pmatrix} \quad (1)$$

[Formula 2]

$$\begin{pmatrix} 1 & 0 & -1 \\ 2 & 0 & -2 \\ 1 & 0 & -1 \end{pmatrix} \quad (2)$$

Next, the coordinate correction processing unit 662a obtains the patch position coordinate correction information (Xp, Yp) by correcting the patch position definition information (xp, yp) included in the chart definition information which is stored in the chart definition information storage unit 102, on the basis of the local coordinate origin $po_0$ $(X_0, Y_0)$ detected in the local coordinate origin detection processing unit 661a (S12). More specifically, the patch position definition information (xp, yp) in the chart local coordinate system xy deviates from the world coordinate system XY by deviation amounts $\Delta x$ $(=X_0)$ and $\Delta y$ $(=Y_0)$ between the world coordinate origin $PO_0$ (0, 0) and the local coordinate origin $po_0$ $(X_0, Y_0)$. For this reason, the coordinate correction processing unit 662a adds each of the coordinate values $(X_0, Y_0)$ of the local coordinate origin $po_0$ in the world coordinate system XY to each of coordinate values (xp, yp) of the patch position definition information. Accordingly, the coordinate values (Xp, Yp) of the patch position definition information (that is, the patch position coordinate correction information) in the world coordinate system XY are obtained ($Xp=xp+X_0$, $Yp=yp+Y_0$).

Then, the first position correction processing unit 663a obtains the patch position correction information by correcting the patch position measurement information obtained in the patch position processing unit 65, on the basis of the patch position coordinate correction information obtained by being corrected in the coordinate correction processing unit 662a (S13), and allows the patch position correction processing step of the first aspect to end.

The actually measured patch position measurement information which is obtained by the patch position processing unit 65 is the world coordinate values (X, Y) in the world coordinate system XY set in the image which is imaged by the imaging unit 5. In a case where the world coordinate origin $PO_0$ of the world coordinate system XY is coincident with the local coordinate origin $po_0$ of the chart local coordinate system xy, the local coordinate values (x, y) are coincident with the world coordinate values (X, Y), and the patch position definition information is not required to be corrected. In many cases, an image IM of the color chart CT which is acquired by the image acquisition processing unit 62 through the imaging unit 5, for example, as illustrated in FIG. 19, is an image including an image portion of the chart region in which the plurality of patches exist, in the entire image IMg, and thus, the world coordinate origin $PO_0$ is not coincident with the local coordinate origin $po_0$. The colorimetric device CM described above is capable of detecting the local coordinate origin $po_0$ from the image IM of the color chart CT by the local coordinate origin detection processing unit 661a, and of acquiring the world coordinate values $(X_0, Y_0)$ of the local coordinate origin $po_0$. Then, the colorimetric device CM described above corrects the patch position definition information (xp, yp) on the basis of the local coordinate origin $po_0$ represented by the world coordinate values $(X_0, Y_0)$ by the coordinate correction processing unit 662a, and thus, patch position coordinate correction information $(xp+X_0, yp+Y_0)$ obtained by the correction is patch position definition information (Xp, Yp) obtained by correcting a deviation between the world coordinate origin $PO_0$ and the local coordinate origin $po_0$. For this reason, the colorimetric device CM described above obtains the patch position correction information by correcting the patch position measurement information on the basis of the patch position coordinate correction information, by the first position correction processing unit 663a, and thus, is capable of obtaining each more accurate position with respect to each of the plurality of patches.

(Patch Position Correction Processing Step of Second Aspect)

Figure 20:
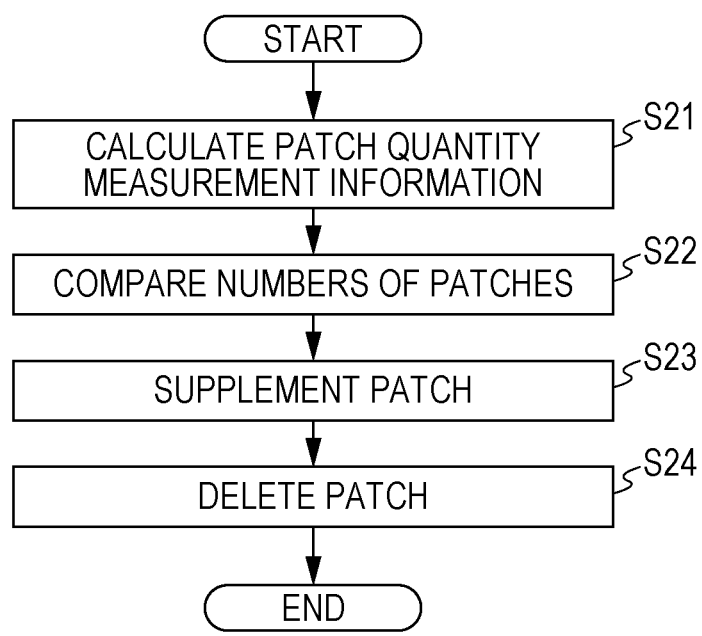
FIG. 20 is a flowchart illustrating an operation of the patch position correction processing unit of the second aspect.
Figure 21A:
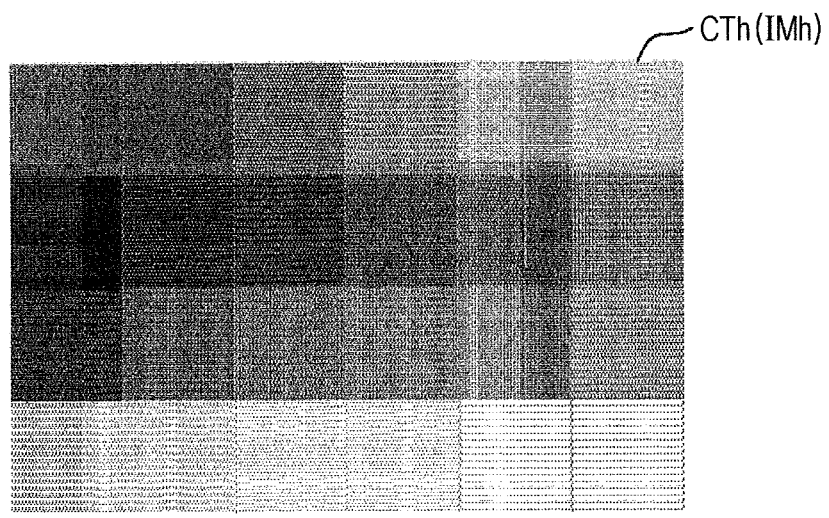
FIG. 21 is a diagram for illustrating an undetected state of the patch in the colorimetric device of the embodiment.
Figure 21B:
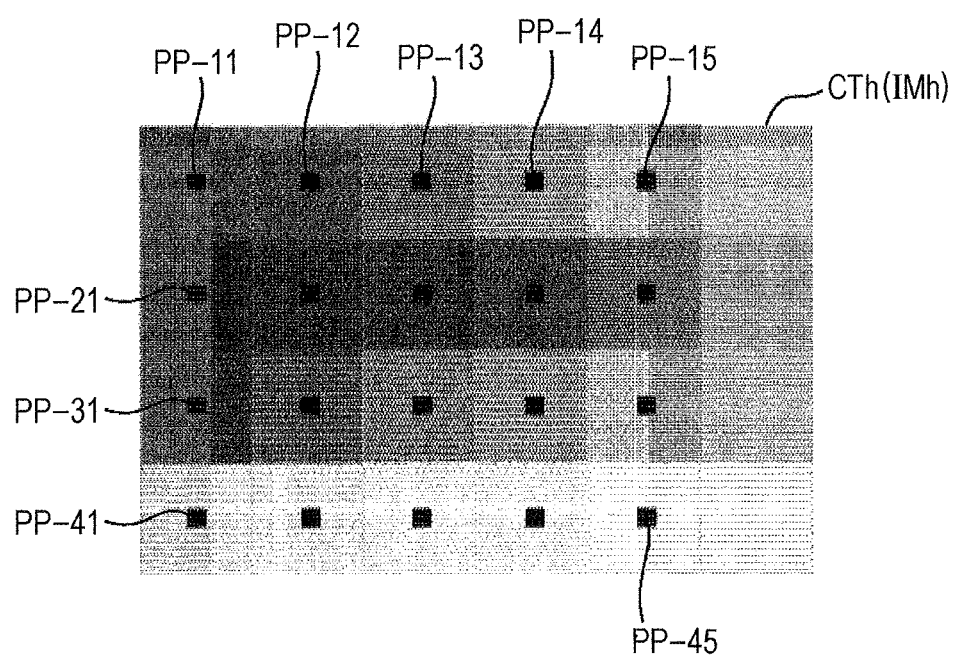
Figure 22A:
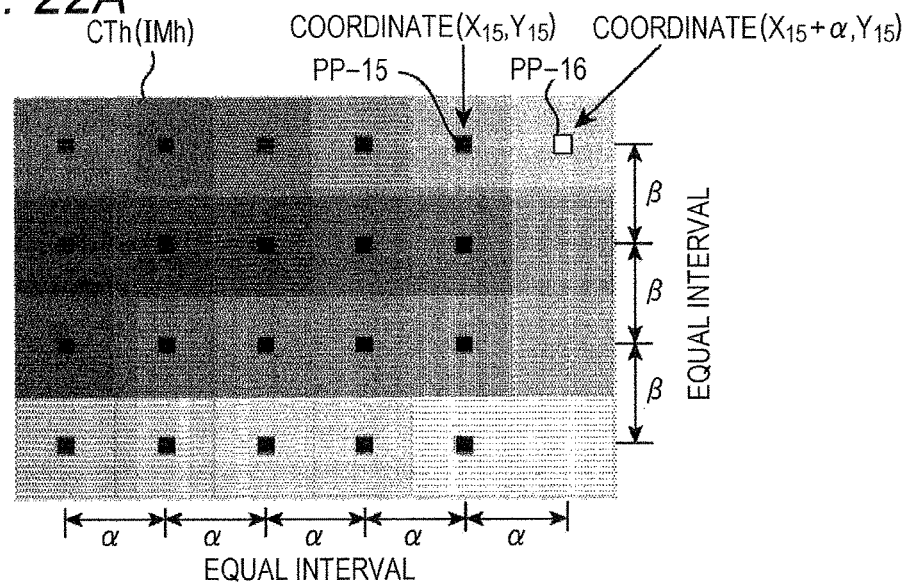
FIG. 22 is a diagram for illustrating an operation of the patch position correction processing unit of the second aspect.
Figure 22B:
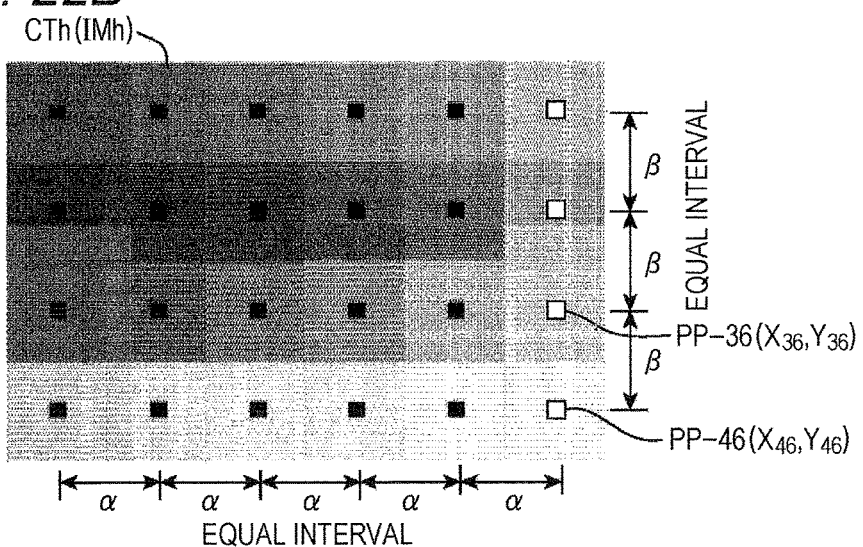
Figure 22C:
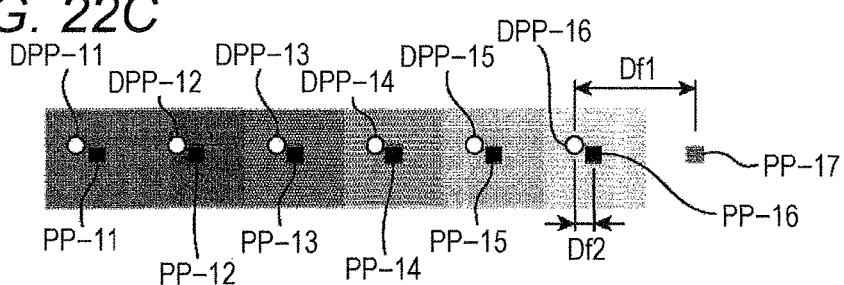

FIG. 20 is a flowchart illustrating the operation of the patch position correction processing unit of the second aspect. FIG. 21 is a diagram for illustrating an undetected state of the patch in the colorimetric device of the embodiment. FIG. 21A illustrates a color chart CTh as an example, and FIG. 21B illustrates each of the positions of each of the patches, which can be detected as a result of processing the color chart CTh in FIG. 21A. FIG. 22 is a diagram for illustrating the operation of the patch position correction processing unit of the second aspect. FIG. 22A is a diagram for illustrating supplement processing of supplementing the position of the undetected patch in the X direction, FIG. 22B is a diagram for illustrating the positions of each of the patches after supplementing the position of the undetected patch, and then, FIG. 22C is a diagram for illustrating delete processing of deleting the position of a patch erroneously detected in the X direction. In FIGS. 21 and 22, ■ represents the position of the patch which is detected by the patch position processing unit 65, □ represents the position of the patch which is supplemented by the second position correction processing unit 663b, and then, ○ represents the position of the patch of the patch position definition information.

In FIG. 20, in the patch position correction processing step of the second aspect, first, the patch quantity detection processing unit 661b obtains the patch quantity measurement information representing the number of patches which is obtained from the image of the color chart CT on the basis of the patch position measurement information obtained in the patch position processing unit 65 (S21). For example, the control processing unit 6 performs each processing of the processing S1 to the processing S5 described above with respect to the color chart CTh provided in color arrangement of a gradation in the shape of a two-dimensional array in four rows by six columns illustrated in FIG. 21A, and thus, as illustrated in FIG. 21B, a difference between the color of the patch and the ground color decreases, and positions PP-11 to PP-45 of each of the patches in four rows by five columns are detected. In this case, the positions PP-11 to PP-45 of each of the patches in four rows by five columns obtained in the patch position processing unit 65 are counted by the patch quantity detection processing unit 661b, and thus, twenty patches are obtained from the image of the color chart CTh, and the patch quantity measurement information (in this example, 20) is obtained.

Next, the patch quantity comparison processing unit 662b compares the number of patches represented by the patch quantity definition information included in the chart definition information which is stored in the chart definition information storage unit 102 with the number of patches represented by the patch quantity measurement information obtained in the patch quantity detection processing unit 661b (S22). For example, in the chart definition information storage unit 102, twenty-four patches in four rows by six columns are stored as the patch quantity definition information corresponding to a color chart TCh illustrated in FIG. 21A. In this case, the patch quantity comparison processing unit 662b compares the number of columns along a row direction (the X direction) for each row. More specifically, the patch quantity comparison processing unit 662b compares six patches represented by the patch quantity definition information with five patches represented by the patch quantity measurement information obtained in the patch quantity detection processing unit 661b in the first row, and determines that five patches represented by the patch quantity measurement information are one less than six patches represented by the patch quantity definition information, and one column is required to be supplemented in the first row, as a comparison result. The patch quantity comparison processing unit 662b compares six patches represented by the patch quantity definition information with five patches represented by the patch quantity measurement information obtained in the patch quantity detection processing unit 661b in the second row, and determines that five patches represented by the patch quantity measurement information are one less than six patches represented by the patch quantity definition information, and one column is required to be supplemented in the second row, as a comparison result. The third row and the fourth row are also similarly processed, and the patch quantity comparison processing unit 662b determines that the number of patches represented by the patch quantity measurement information is one less than the number of patches represented by the patch quantity definition information in the third row, and one column is required to be supplemented in the third row, and determines that the number of patches represented by the patch quantity measurement information is one less than the number of patches represented by the patch quantity definition information in the fourth row, and one column is required to be supplemented in the fourth row.

In addition, for example, the patch quantity comparison processing unit 662*b* may compare the number of rows along a column direction (the Y direction) for each column. For example, the patch quantity comparison processing unit 662*b* compares four patches represented by the patch quantity definition information with four patches represented by the patch quantity measurement information obtained in the patch quantity detection processing unit 661*b* in the first column, and determines that four patches represented by the patch quantity measurement information are identical to four patches represented by the patch quantity definition information, and there is no excess or deficiency and there is no requirement for the supplement, as a comparison result. Other columns are also similarly processed, and the patch quantity comparison processing unit 662*b* determines that the number of patches represented by the patch quantity measurement information is identical to the number of patches represented by the patch quantity definition information in the second column, and the supplement is not required in the second column, determines that the number of patches represented by the patch quantity measurement information is identical to the number of patches represented by the patch quantity definition information in the third column, and the supplement is not required in the third column, determines that the number of patches represented by the patch quantity measurement information is identical to the number of patches represented by the patch quantity definition information in the fourth column, and the supplement is not required in the fourth column, determines that the number of patches represented by the patch quantity measurement information is identical to the number of patches represented by the patch quantity definition information in the fifth column, and the supplement is not required in the fifth column, and then, determines that the number of patches represented by the patch quantity measurement information is four less than the number of patches represented by the patch quantity definition information in the sixth column, and four rows are required to be supplemented in the sixth column.

Next, in a case where the number of patches represented by the patch quantity measurement information is less than the number of patches represented by the patch quantity definition information as a result of performing the comparison in the patch quantity comparison processing unit 662*b*, the second position correction processing unit 663*b* obtains the patch position correction information by supplementing the patch position non-detection information representing the position of the undetected patch (S23). For example, the second position correction processing unit 663*b* obtains the patch position non-detection information by assuming the position of the undetected patch for each row in each example, and obtains the patch position correction information by supplementing the patch position measurement information obtained in the patch position processing unit 65, by the obtained patch position non-detection information. In the example described above, as illustrated in FIG. 22A, the second position correction processing unit 663*b* obtains an interval $\alpha$ between the respective patches adjacent to each other along the row direction (the X direction) in the first row, from the patch position measurement information obtained in the patch position processing unit 65, obtains an X coordinate $X_{16}$ in the position of the patch in one row by six columns by adding the interval $\alpha$ to an X coordinate $X_{15}$ in the position of the patch in one row by five columns, and obtains a Y coordinate $Y_{16}$ in the position of the patch in one row by six columns by directly using a Y coordinate $Y_{15}$ in the position of the patch in one row by five columns ($X_{16}=X_{15}+\alpha$, $Y_{16}=Y_{15}$). Accordingly, patch position non-detection information PP-16 ($X_{15}+\alpha$, $Y_{15}$) of the first row is obtained. In a case where the interval $\alpha$ between the patches is uneven, the interval $\alpha$ is set to an interval $\alpha$ which is represented by various values such as a maximum value, a minimum value, a center value, and an average value thereof, and is used for the supplement. The second row to the fourth row are also similarly processed, patch position non-detection information PP-26 ($X_{25}+\alpha$, $Y_{25}$) of the second row is obtained, patch position non-detection information PP-36 ($X_{35}+\alpha$, $Y_{35}$) of the third row is obtained, and then, patch position non-detection information PP-46 ($X_{45}+\alpha$, $Y_{45}$) of the fourth row is obtained. Accordingly, as illustrated in FIG. 22B, the positions of all of the patches which also include the position of the undetected patch, are obtained. Furthermore, in a case where the patch position non-detection information PP-46 ($X_{46}$, $Y_{46}$) of the fourth row is obtained, the second position correction processing unit 663*b* may obtain an interval $\beta$ between the respective patches adjacent to each other along the column direction (the Y direction), from the patch position measurement information obtained in the patch position processing unit 65, may obtain a Y coordinate $Y_{46}$ in the position of the patch in four rows by six columns is obtained by adding the interval $\beta$ to a Y coordinate $Y_{36}$ in the position of the patch in three rows by six columns, and may obtain an X coordinate $X_{46}$ in the position of the patch in four rows by six columns by directly using an X coordinate $X_{36}$ in the position of the patch in three rows by six columns ($X_{46}=X_{36}$, $Y_{46}=Y_{36}+\beta$). In addition, as with a case of deleting the patch erroneously detected described below, determination of whether or not the undetected patch is supplemented in a +X direction with respect to the fifth column, that is, in the sixth column or the undetected patch is supplemented in a −X direction with respect to the first column, that is, in the zeroth column, can be executed by comparing the patch position definition information with the patch position measurement information, and by obtaining a difference between the patch position definition information and the patch position measurement information, and can be executed by comparing the patch color definition information with the actually measured patch color measurement information.

In addition, as with a case of deleting the patch erroneously detected described below, determination of whether or not the undetected patch is supplemented in a +X direction with respect to the fifth column, that is, in the sixth column or the undetected patch is supplemented in a −X direction with respect to the first column, that is, in the zeroth column, can be executed by comparing the patch position definition information with the patch position measurement information, and by obtaining a difference between the patch position definition information and the patch position measurement information, and can be executed by comparing the patch color definition information with the actually measured patch color measurement information.

In addition, for example, the second position correction processing unit 663*b* may obtain the patch position non-detection information by assuming the position of the undetected patch for each column in each row, and may obtain the patch position correction information by supplementing the patch position measurement information obtained in the patch position processing unit 65, by the obtained patch position non-detection information.

Then, in a case where the number of patches represented by the patch quantity measurement information is greater than the number of patches represented by the patch quantity definition information as a result of performing the comparison in the patch quantity comparison processing unit 662b, the third position correction processing unit 664b obtains the patch position correction information by deleting the patch position false detection information representing the position of the patch erroneously detected (S24), and allows the patch position correction processing step of the second aspect to end. For example, the third position correction processing unit 664b obtains the patch position false detection information by assuming the position of the patch erroneously detected for each row in each column, and obtains the patch position correction information by deleting the position of the patch erroneously detected from the patch position measurement information obtained in the patch position processing unit 65 or from the patch position correction information obtained in the second position correction processing unit 663b, by the obtained patch position false detection information. For example, the control processing unit 6 performs each processing of the processing S1 to the processing S5 described above with respect to the color chart CTh illustrated in FIG. 21A, and thus, as illustrated in FIG. 22C, the positions PP-11 to PP-17 of each of the patches are detected in seven columns, in the first row, for example, due to failure (abnormality) in the color chart CTh, such as fouling. It is considered that a difference between the actual positions of each of the patches and the positions of each of the patches represented by the patch position definition information in the color chart CT is comparatively small. In such a consideration, the third position correction processing unit 664b compares the positions of each of the patches (coordinate values of each of the patches) represented by the patch position definition information with the positions of each of the patches (coordinate values of each of the patches) represented by the patch position measurement information, and assumes a patch which is closest to the position of the patch (the coordinate value of the patch) represented by the patch position definition information as the patch represented by the patch position definition information, from each of the patches represented by the patch position measurement information. That is, each of the patches represented by the patch position measurement information, which are relatively separated from the patch represented by the patch position definition information is determined as the patch erroneously detected, in the patch represented by the patch position definition information. For example, in FIG. 6C, a patch in one row by one column is determined as a patch having the position PP-11 of the patch represented by the patch position measurement information, which is closest to a position DPP-11 of the patch represented by the patch position definition information. Similarly, each patch in one row by two columns, in one row by three columns, in one row by four columns, and in one row by five columns, is sequentially determined as each patch having the position PP-12 of the patch, the position PP-13 of the patch, the position PP-14 of the patch, and the position PP-15 of the patch, which are represented by the position measurement information. Then, the position PP-16 of the patch represented by the patch position measurement information is closest to the position DPP-11 of the patch represented by the patch position measurement information from the position of the other patch including the position PP-17 of the patch represented by the patch position measurement information, and thus, a patch in one row by six columns is a patch having the position PP-16 of the patch represented by the patch position measurement information. Therefore, the position PP-17 of the patch represented by the patch position measurement information is determined as the patch position false detection information.

Here, it is preferable that the patch position definition information is the patch position correction information which is corrected by each processing illustrated in FIG. 18 described above.

In addition, for example, the third position correction processing unit 664b may obtain the patch position false detection information by assuming the position of the patch erroneously detected for each column in each row, and may obtain the patch position correction information by deleting the position of the patch erroneously detected from the patch position measurement information obtained in the patch position processing unit 65, by the obtained patch position false detection information.

Furthermore, in the above case, in the comparison of the positions of each of the patches, only one of an X coordinate value and a Y coordinate value may be used in order to reduce an information processing amount.

In addition, in the above case, in a case where the position of the patch represented by the patch position measurement information which is obtained in the patch position processing unit 65 is positioned out of the frame represented by the chart region frame definition information included in the chart definition information which is stored in the chart definition information storage unit 102, it is preferable that the third position correction processing unit 664b sets the patch position measurement information of the patch to the patch position false detection information. A patch detected out of the frame of the chart region is the patch erroneously detected. Therefore, the colorimetric device CM is capable of easily determining whether or not the patch position measurement information is the patch position false detection information by determining whether the position of the patch represented by the patch position measurement information which is obtained in the patch position processing unit 65 is within the frame of the chart region or out of the frame, and of easily deleting the patch position measurement information for the patch erroneously detected.

In a case where the number of patches represented by the patch quantity measurement information which is obtained in the patch quantity detection processing unit is less than the number of patches represented by the patch quantity definition information, the number of patches obtained from an image IMh of the color chart CTh is insufficient, and the undetected patch exists, such a colorimetric device CM obtains the patch position correction information by supplementing the patch position non-detection information representing the position of the undetected patch, by the second position correction processing unit 663b, and thus, is capable of obtaining each more accurate position with respect to each of the plurality of patches.

In a case where the number of patches represented by the patch quantity measurement information which is obtained in the patch quantity detection processing unit is greater than the number of patches represented by the patch quantity definition information, the number of patches obtained from the image IMh of the color chart CTh is excessive, and the patch erroneously detected exists, such a colorimetric device CM obtains the patch position correction information by deleting the patch position false detection information representing the position of the patch erroneously detected, by the third position correction processing unit 664b, and thus, is capable of obtaining each more accurate position with respect to each of the plurality of patches.

(Patch Position Correction Processing Step of Third Aspect)

Figure 23:
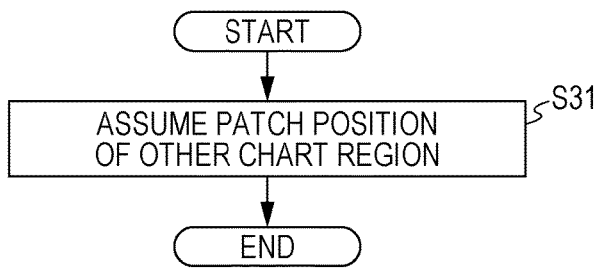
FIG. 23 is a flowchart illustrating an operation of the patch position correction processing unit of the third aspect.
Figure 24:
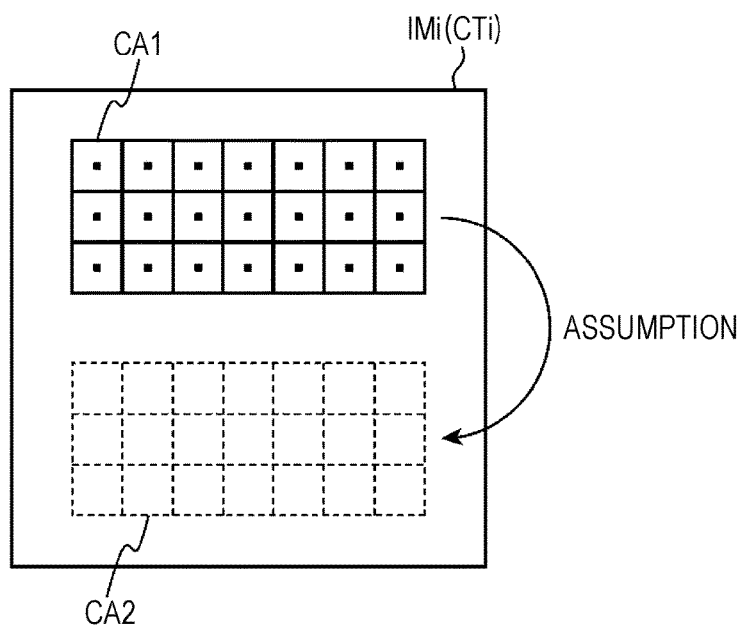
FIG. 24 is a diagram for illustrating the operation of the patch position correction processing unit of the third aspect.

FIG. 23 is a flowchart illustrating the operation of the patch position correction processing unit of the third aspect. FIG. 24 is a diagram for illustrating the operation of the patch position correction processing unit of the third aspect.

In FIG. 23, in the patch position correction processing step of the third aspect, the fourth position correction processing unit 661c obtains the patch position correction information in at least any one chart region of residual chart regions of the plurality of chart regions, on the basis of the patch position measurement information obtained in the patch position processing unit 65, in any one chart region of the plurality of chart regions, (S31), and allows the patch position correction processing step of the third aspect to end. For example, a color chart CTi includes two chart regions of first and second chart regions CA1 and CA2, and the control processing unit 6 performs each processing of the processing S1 to the processing S5 described above with respect to each of the first and second chart regions CA1 and CA2 in the color chart CTi, and thus, as illustrated in FIG. 24, the positions of each of the patches in the first chart region CA1 are detected. In this case, the fourth position correction processing unit 661c obtains the patch position correction information in the second chart region CA2 on the basis of the patch position measurement information obtained in the patch position processing unit 65 in the first chart region CA1. More specifically, the fourth position correction processing unit 661c compares the patch position measurement information obtained in the patch position processing unit 65 in the first chart region CA1 with the patch position definition information stored in the chart definition information storage unit 102, and obtains a magnification rate or a reduction rate, a translation amount (a parallel movement amount), and a rotation amount of the patch position measurement information by using a known image processing technology on the basis of the patch position definition information. Then, the fourth position correction processing unit 661c corrects the patch position definition information stored in the chart definition information storage unit 102 in the first chart region CA1 by using the magnification rate or the reduction rate, the translation amount (the parallel movement amount), and the rotation amount, which are obtained, and thus, obtains the patch position correction information in the second chart region CA2 by assuming the positions of each of the patches in the second chart region CA2. Here, it is preferable that the patch position definition information is the patch position correction information which is corrected by each processing illustrated in FIG. 18 described above. Furthermore, one or a plurality of the magnification rate or the reduction rate, the translation amount (the parallel movement amount), and the rotation amount described above may be omitted in order to reduce the information processing amount.

Even in a case where all or a part of each of the patch position measurement information items of each of the patches are not obtained by the patch position processing unit 65, such a colorimetric device CM is capable of obtaining the patch position information which is not obtained by the patch position processing unit 65 by assuming the patch position information on the basis of the patch position measurement information obtained in the patch position processing unit 65 in any one chart region CA of the plurality of chart regions CA, by the fourth position correction processing unit 661c. Therefore, such a colorimetric device CM is capable of obtaining each more accurate position with respect to the plurality of patches.

(Patch Position Correction Processing Step of Fourth Aspect)

Figure 25:
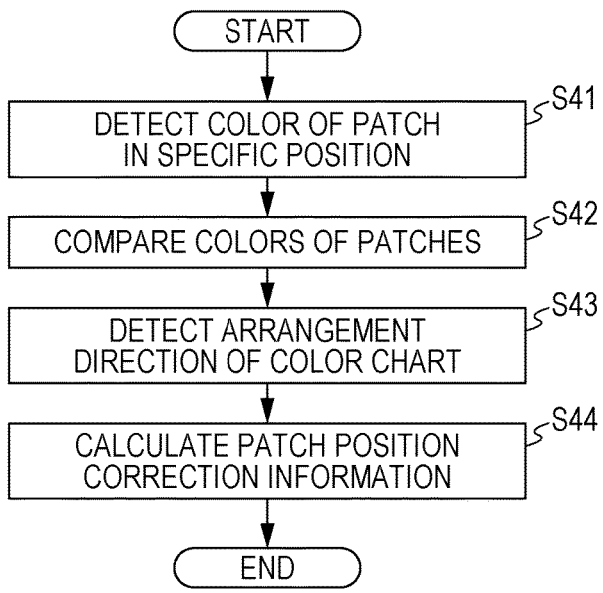
FIG. 25 is a flowchart illustrating an operation of the patch position correction processing unit of the fourth aspect.

FIG. 25 is a flowchart illustrating the operation of the patch position correction processing unit of the fourth aspect. FIG. 26 is a diagram for illustrating the operation of the patch position correction processing unit of the fourth aspect. FIG. 26A illustrates a color chart CTj disposed in an incorrect arrangement direction, and FIG. 26B illustrates the color chart CTj disposed in a correct arrangement direction.

In FIG. 25, in the patch position correction processing step of the fourth aspect, first, the patch color detection processing unit 661d obtains the color of the patch which is positioned in the specific position set in advance, in the plurality of patches, as the specific position patch color measurement information, from the image of the color chart CT acquired in the image acquisition processing unit 62 (S41). The specific position is suitably set according to the shape of the circumscribed figure (the outline figure) of the chart region in which the plurality of patches exist, and for example, in a case where the circumscribed figure of the chart region is in the shape of a polygon, the specific position is set to the position of a patch including one vertex of a plurality of vertices. For example, as illustrated in FIG. 26, in a case where the color chart CT is the color chart CTj which is provided in color arrangement of a gradation in the shape of a two-dimensional array in six rows by six columns such that the circumscribed figure of the chart region is in the shape of a quadrangle, the position of the patch positioned on the upper left edge including the upper left vertex (that is, the local coordinate origin $po_0$) is set to the specific position.

Figure 26B:
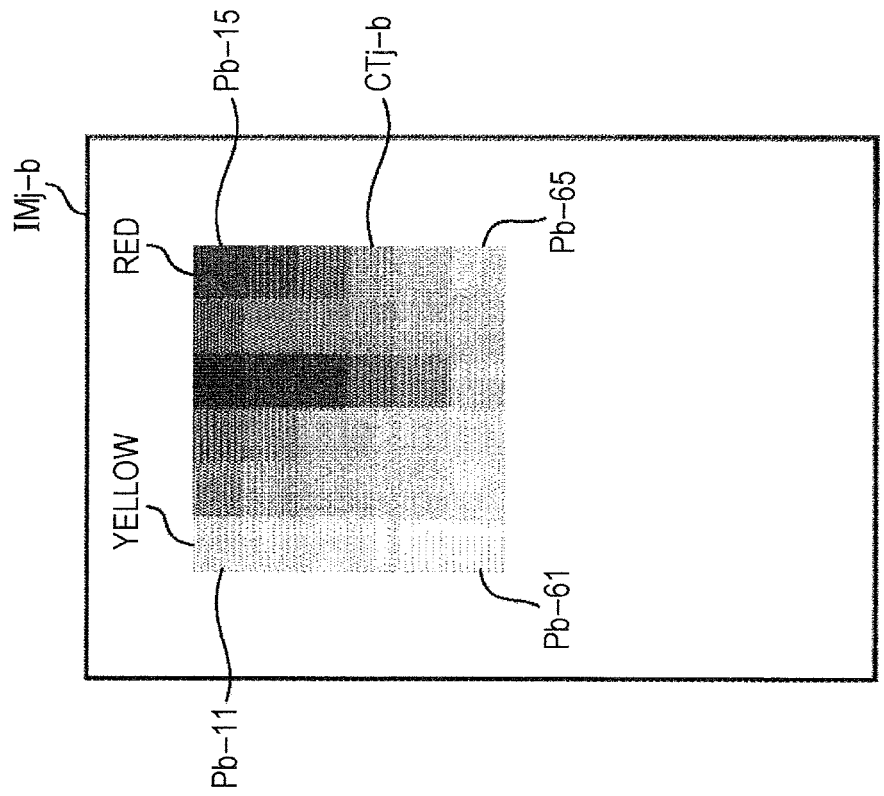
FIG. 26 is a diagram for illustrating the operation of the patch position correction processing unit of the fourth aspect.
Figure 26A:
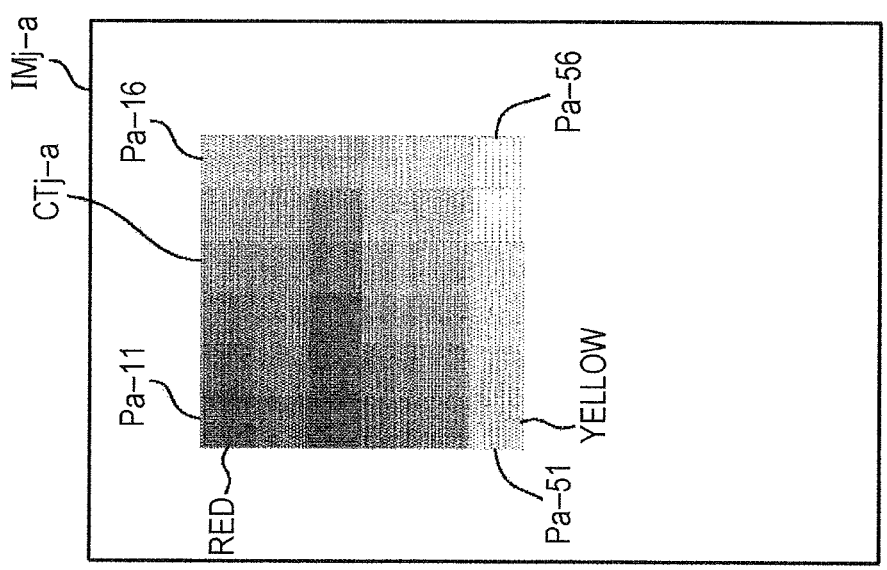

As illustrated in FIG. 26B, in a case where the color chart CTj is provided in the sub-scanning direction moving unit (the sheet conveyance unit) 2 of the colorimetric device CM in the correct arrangement direction, that is, in a case where arrangement positions of each of the patches of the color chart CTj are arranged in the sub-scanning direction moving unit (the sheet conveyance unit) 2 of the calorimetric device CM in the arrangement direction which is coincident with the arrangement positions of each of the patches of the chart definition information, each of patches Pb-11 to Pb-61 in the first column has each of colors such that a gradation is obtained in which a yellow color is gradually paled out from the patch Pb-11 in one row by one column to the patch Pb-61 in six rows by one column, each of patches Pb-12 to Pb62 in the second column has each of colors such that a gradation is obtained in which a flesh color is gradually paled out from the patch Pb-12 in one row by two columns to the patch Pb-62 in six rows by two columns, each of patches Pb-13 to Pb-63 in the third column has each of colors such that a gradation is obtained in which a water color is gradually paled out from the patch Pb-13 in one row by three columns to the patch Pb-63 in six rows by three columns, each of patches Pb-14 to Pb64 in the fourth column has each of colors such that a gradation is obtained in which a blue color is gradually paled out from the patch Pb-14 in one row by four columns to the patch Pb-64 in six rows by four columns, each of patches Pb-15 to Pb-65 in the fifth column has each of colors such that a gradation is obtained in which a green color is gradually paled out from the patch Pb-15 in one row by five columns to the patch Pb-61 in six rows by five columns, and each of patches Pb-16 to Pb-66 in the sixth column has each of colors such that a gradation is obtained in which a red color is gradually paled out from the patch Pb-16 in one row by six columns to the patch Pb-66 in six rows by six columns.

As illustrated in FIG. 26A, in such a color chart CTj, patches Pa-11 to Pa-16 in the first row are respectively arranged in the sub-scanning direction moving unit (the sheet conveyance unit) 2 of the colorimetric device CM such that a gradation is obtained in which a red color is gradually paled out from the patch Pa-11 in one row by one column to the patch Pa-16 in one row by six columns. In this case, in the processing S41 described above, the patch color detection processing unit 661d obtains the color of the patch Pa-11 positioned on an upper left edge (in one row by one column) of thirty-six patches in six rows by six columns, that is, a red color, as the specific position patch color measurement information, from an image IMj of the color chart CTj acquired in the image acquisition processing unit 62.

Next, the patch color comparison processing unit 662d compares the color of the patch represented by the patch color definition information of the patch positioned in the specific position, included in the chart definition information which is stored in the chart definition information storage unit 102, with the color of the patch obtained in the patch color detection processing unit 661d (S42). In an example illustrated in FIG. 26, the patch color comparison processing unit 662d compares the color of the patch (in this example, a yellow color) represented by the patch color definition information of the patch Pb-11 positioned in a position in one row by one column, included in the chart definition information which is stored in the chart definition information storage unit 102, with the color of the patch Pa-11 (in this example, a red color) obtained in the patch color detection processing unit 661d.

Next, the chart arrangement direction detection processing unit 663d obtains the arrangement direction of the color chart CT on the basis of the result of performing the comparison in the patch color comparison processing unit 662d (S43). In this example, as a result of performing the comparison in the patch color comparison processing unit 662d, the patch color definition information is a yellow color, and the color of the patch Pa-11 obtained in the patch color detection processing unit 661d is a red color, and thus, the respective patches Pb-11 and Pa-11 have colors different from each other, and therefore, the chart arrangement direction detection processing unit 663d determines that the color chart CTj provided in the sub-scanning direction moving unit (the sheet conveyance unit) 2 of the colorimetric device CM is not provided in the correct arrangement direction. Then, the chart arrangement direction detection processing unit 663d retrieves (searches) the same color as the red color of the patch Pa-11 obtained in the patch color detection processing unit 661d from the patch color definition information, determines the position of the patch having the same color as the red color of the patch Pa-11, and compares the respective positions of each of the patches, and thus, determines that the arrangement direction is an arrangement direction which is rotated in a counterclockwise rotation by 90 degrees, and obtains the arrangement direction of the color chart CTj. Alternatively, the chart arrangement direction detection processing unit 663d retrieves (searches) the same color as the yellow color of the patch represented by the patch color definition information of the patch Pb-11 positioned in the position in one row by one column from each of the colors of each of the patches obtained by performing the colorimetry with respect to each of the patches of the color chart CTj, determines the position of the patch having the same color as the yellow color of the patch Pb-11, and compares the respective positions of each of the patches, and thus, determines that the arrangement direction is an arrangement direction which is rotated in a counterclockwise rotation by 90 degrees, and obtains the arrangement direction of the color chart CTj.

Furthermore, in the determination of the arrangement direction, there may be one specific position, and there may be a plurality of specific positions. In particular, in a case where there are the plurality of specific positions, it is possible to determine the arrangement direction even in a case where it is difficult to determine the arrangement direction in one specific position. It is preferable that the plurality of specific positions are patches adjacent to each other (for example, patches adjacent to each other along the X direction, patches adjacent to each other along the Y direction, or the like).

In addition, in the above description, the colors of each of the patches are compared by hue, and may be compared by other indices relevant to a color such as density (luminance).

Then, the fifth position correction processing unit 664d obtains the patch position correction information by correcting the patch position measurement information obtained in the patch position processing unit 65, on the basis of the arrangement direction of the color chart CT obtained in the chart arrangement direction detection processing unit 663d (S44), and allows the patch position correction processing step of the fourth aspect to end. For example, the fifth position correction processing unit 664d obtains the patch position correction information by rotating and correcting the position of each of the patches represented by the patch position measurement information to be the correct arrangement direction, that is, to be coincident with the arrangement positions of each of the patches of the chart definition information.

Such a colorimetric device CM compares the color of the patch (in the example described above, the patch Pa-11) obtained in the patch color detection processing unit 661d, with respect to the patch positioned in the specific position (for example, the position in one row by one column, or the like) set in advance, with the color of the patch (in the example described above, the patch Pb-11) represented by the patch color definition information, by the patch color comparison processing unit 662d, obtains the arrangement direction of the color chart CTj on the basis of the comparison result, by the chart arrangement direction detection processing unit 663d, and obtains the patch position correction information by correcting the patch position measurement information on the basis of the obtained arrangement direction of the color chart CTj, by the fifth position correction processing unit 664d. For this reason, even in a case where the arrangement direction of the color chart CTj is not coincident with a predetermined arrangement direction of the chart definition information, which is assumed, such a colorimetric device CM is capable of obtaining each more accurate position with respect to each of the plurality of patches.

Furthermore, in the embodiment described above, the colorimetric device CM includes the imaging unit 5 configured of a line sensor or the like in which a plurality of photoelectric conversion elements are arranged along one direction, and may include an imaging unit configured of an area sensor (a two-dimensional image sensor) or the like in which a plurality of photoelectric conversion elements are two-dimensionally arranged in two directions (for example, two directions orthogonal to each other, or the like) which are linearly independent from each other, instead of the imaging unit 5. The imaging unit configured of such an area sensor or the like is capable of imaging the entire image of the color chart CT even in a case where the color chart CT is not conveyed as described above.

In this embodiment described above, the movement of the position of the colorimetric unit 3 with respect to the sheet of the object to be measured is realized by moving the colorimetric unit 3 by the main scanning direction moving unit 4 along the main scanning direction, and is realized by moving the sheet of the object to be measured by the sub-scanning direction moving unit 2 along the sub-scanning direction, but is not limited thereto. The moving unit relatively moving the position of the colorimetric unit 3 with respect to the sheet of the object to be measured, for example, may be a moving mechanism moving the colorimetric unit 3 in two directions of the main scanning direction and the sub-scanning direction, with respect to the sheet of the object to be measured mounted on a stage in a resting state, and for example, may be an XY stage on which the sheet of the object to be measured is mounted and which moves the sheet of the object to be measured in two directions of the main scanning direction and the sub-scanning direction, with respect to the fixed colorimetric unit 3. In addition, for example, the moving unit may be configured to move the colorimetric unit 3 in one direction of the main scanning direction and the sub-scanning direction, and to move the stage in the other direction. In the moving unit having such a configuration, the imaging unit configured of the area sensor or the like described above is preferable.

In the embodiment described above, the pattern determination processing unit 63 may be configured to detect the predetermined optical characteristic amount or the predetermined geometric characteristic amount from the residual regions excluding the region of a predetermined color from the image of the color chart CT which is acquired in the image acquisition processing unit 62.

Such a colorimetric device CM, for example, sets in advance a color which is not a general chart region as the predetermined color, and thus, the region which is not the general chart region is excluded from a target region detecting the predetermined optical characteristic amount or the predetermined geometric characteristic amount, and therefore, the predetermined optical characteristic amount or the predetermined geometric characteristic amount relevant to only the chart region can be detected. As a result thereof, the chart region is determined by excluding the region which is not the general chart region, and thus, the colorimetric device CM described above is capable of further reducing erroneous determination of the chart region, and of more suitably determining the chart region.

In the embodiment described above, the input unit 7 may be configured such that a plurality of selection results can be input by the user as the arrangement pattern used by the pattern determination processing unit 63 from the plurality of arrangement patterns stored in the pattern storage unit 101, and the pattern determination processing unit 63 may be configured such that the arrangement pattern corresponding to the color chart CT acquired in the image acquisition processing unit 62 is determined on the basis of the image of the color chart CT acquired in the image acquisition processing unit 62, from the plurality of arrangement patterns which are stored in the pattern storage unit 101 and are input by the input unit 7. For example, the input unit 7 and the output unit 8 configure the touch panel described above, and the plurality of arrangement patterns stored in the pattern storage unit 101 is displayed on the output unit 8.

Then, the user selects a plurality of arrangement patterns used by the pattern determination processing unit 63 from the plurality of displayed arrangement patterns, and touches each display position of each of the plurality of selected arrangement patterns. Accordingly, the plurality of arrangement patterns selected by the user as the arrangement pattern used by the pattern determination processing unit 63 is input into the colorimetric device CM through the input unit 7, and is set. Such a colorimetric device CM is capable of inputting the plurality of arrangement patterns used by the pattern determination processing unit 63 by selecting the plurality of arrangement patterns, and thus, even in a case where the types of the color charts used by the user are different from each other, it is possible to select the arrangement pattern according to the user.

Herein, as described above, technologies of various aspects are disclosed, and the main technology thereof is as follow.

A colorimetric device according to an aspect includes: a colorimetric unit that measures a color; an imaging unit that acquires an image; a moving unit that relatively moves a position of the colorimetric unit with respect to a sheet of an object to be measured; a chart definition information storage unit that stores chart definition information including at least patch position definition information representing each position of a plurality of patches in a color chart including the plurality of patches, which are predetermined color regions; an image acquisition processing unit that acquires an image of the color chart by the imaging unit; a patch position processing unit that obtains patch position measurement information representing the position of the patch on the basis of the image of the color chart which is acquired in the image acquisition processing unit; a patch position correction processing unit that obtains patch position correction information by correcting the patch position measurement information obtained in the patch position processing unit, on the basis of the chart definition information which is stored in the chart definition information storage unit; and a color measurement processing unit that relatively moves the position of the colorimetric unit with respect to the color chart to each of the positions of the plurality of patches represented by the patch position correction information obtained in the patch position correction processing unit by the moving unit, and measures each color of the plurality of patches by the colorimetric unit.

Such a colorimetric device corrects the actually measured patch position measurement information which is obtained by the patch position processing unit on the basis of the image of the color chart actually acquired in the image acquisition processing unit, on the basis of the chart definition information, and thus, is capable of obtaining each more accurate position with respect to each of the plurality of patches. Then, the colorimetric device described above relatively moves the position of the colorimetric unit with respect to the color chart to each of more accurate positions by the moving unit, and measures the colors of each of the plurality of patches by the colorimetric unit. For this reason, the colorimetric device described above is capable of performing colorimetry with respect to each of the patches in a more suitable position.

According to another aspect, in the colorimetric device described above, the patch position definition information is a local coordinate value of a chart local coordinate system in which a specific point set in advance in the color chart is set to a local coordinate origin, and the patch position correction processing unit includes a local coordinate origin detection processing unit that detects the local coordinate origin from the image of the color chart which is acquired in the image acquisition processing unit, a coordinate correction processing unit that obtains patch position coordinate correction information by correcting the patch position definition information included in the chart definition information which is stored in the chart definition information storage unit, on the basis of the local coordinate origin detected in the local coordinate origin detection processing unit, and a first position correction processing unit that obtains the patch position correction information by correcting the patch position measurement information obtained in the patch position processing unit, on the basis of the patch position coordinate correction information obtained by being corrected in the coordinate correction processing unit.

The actually measured patch position measurement information obtained by the patch position processing unit is the world coordinate value of the world coordinate system set in the image which is obtained by being imaged by the imaging unit. In a case where the world coordinate origin of the world coordinate system is coincident with the local coordinate origin of the chart local coordinate system, the local coordinate value is coincident with the world coordinate value, and thus, the patch position definition information is not required to be corrected. In many cases, for example, the world coordinate origin is set on the upper left vertex (the upper left edge) of the image in the plan view, and the local coordinate origin is set on the upper left vertex (the upper left edge) of the color chart in the plan view. Then, in many cases, the image of the color chart which is acquired by the image acquisition processing unit through the imaging unit is an image including the image portion of the chart region in which the plurality of patches exist, in the entire image, and thus, the world coordinate origin is not coincident with the local coordinate origin. The colorimetric device described above detects the local coordinate origin from the image of the color chart, by the local coordinate origin detection processing unit, and is capable of acquiring the world coordinate value of the local coordinate origin. Then, the colorimetric device described above corrects the patch position definition information on the basis of the local coordinate origin represented by the world coordinate value, by the coordinate correction processing unit, and the patch position coordinate correction information obtained by the correction is the patch position definition information obtained by correcting a deviation between the world coordinate origin and the local coordinate origin. For this reason, the colorimetric device described above obtains the patch position correction information by correcting the patch position measurement information on the basis of the patch position coordinate correction information, by the first position correction processing unit, and thus, is capable of obtaining each more accurate position with respect to each of the plurality of patches.

According to another aspect, in the colorimetric device described above, the chart definition information further includes patch quantity definition information representing the number of plurality of patches, and the patch position correction processing unit includes a patch quantity detection processing unit that obtains patch quantity measurement information representing the number of patches which is obtained from the image of the color chart on the basis of the patch position measurement information obtained in the patch position processing unit, a patch quantity comparison processing unit that compares the number of patches represented by the patch quantity definition information included in the chart definition information which is stored in the chart definition information storage unit with the number of patches represented by the patch quantity measurement information obtained in the patch quantity detection processing unit, and a second position correction processing unit that obtains the patch position correction information by supplementing patch position non-detection information representing a position of an undetected patch in a case where the number of patches represented by the patch quantity measurement information is less than the number of patches represented by the patch quantity definition information, as a result of performing the comparison in the patch quantity comparison processing unit.

In a case where the number of patches represented by the patch quantity measurement information which is obtained in the patch quantity detection processing unit is less than the number of patches represented by the patch quantity definition information, the number of patches obtained from the image of the color chart is insufficient, and the patch which is not detected by the patch position processing unit exists, such a colorimetric device obtains the patch position correction information by supplementing the patch position non-detection information representing the position of the undetected patch, by the second position correction processing unit, and thus, is capable of obtaining each more accurate position with respect to each of the plurality of patches.

According to another aspect, in the colorimetric device described above, the chart definition information further includes patch quantity definition information representing the number of plurality of patches, and the patch position correction processing unit includes a patch quantity detection processing unit that obtains patch quantity measurement information representing the number of patches which is obtained from the image of the color chart on the basis of the patch position measurement information obtained in the patch position processing unit, a patch quantity comparison processing unit that compares the number of patches represented by the patch quantity definition information included in the chart definition information which is stored in the chart definition information storage unit with the number of patches represented by the patch quantity measurement information obtained in the patch quantity detection processing unit, and a third position correction processing unit that obtains the patch position correction information by deleting patch position false detection information representing a position of a patch erroneously detected, in a case where the number of patches represented by the patch quantity measurement information is greater than the number of patches represented by the patch quantity definition information, as a result of performing the comparison in the patch quantity comparison processing unit.

In a case where the number of patches represented by the patch quantity measurement information which is obtained in the patch quantity detection processing unit is greater than the number of patches represented by the patch quantity definition information, the number of patches obtained from the image of the color chart is excessive, and the patch exists erroneously detected by the patch position processing unit, such a colorimetric device obtains the patch position correction information by deleting the patch position false detection information representing the position of the patch erroneously detected, by the third position correction processing unit, and thus, is capable of obtaining each more accurate position with respect to each of the plurality of patches.

According to another aspect, in the colorimetric device described above, the chart definition information further includes chart region frame definition information representing a frame of a chart region in which the plurality of patches exist, and in a case where a position of a patch represented by the patch position measurement information which is obtained in the patch position processing unit is positioned out of the frame represented by the chart region frame definition information included in the chart definition information which is stored in the chart definition information storage unit, the third position correction processing unit sets the patch position measurement information of the patch to the patch position false detection information.

The patch detected out of the frame of the chart region is the patch erroneously detected. Therefore, the colorimetric device described above is capable of easily determining whether or not the patch position measurement information is the patch position false detection information by determining whether or not the position of the patch represented by the patch position measurement information which is obtained in the patch position processing unit is within the frame of the chart region or out of the frame, and of easily deleting the patch position measurement information of the patch erroneously detected.

According to another aspect, in the colorimetric device described above, the color chart includes a plurality of chart regions in which the plurality of patches exist, and the patch position correction processing unit includes a fourth position correction processing unit that obtains the patch position correction information in at least any one chart region of residual chart regions of the plurality of chart regions, on the basis of the patch position measurement information obtained in the patch position processing unit, in any one chart region of the plurality of chart regions.

Even in a case where all or a part of each of the patch position measurement information items of each of the patches are not obtained by the patch position processing unit, such a colorimetric device is capable of obtaining the patch position information which is not obtained by the patch position processing unit by assuming the patch position information on the basis of the patch position measurement information obtained in the patch position processing unit in any one chart region of the plurality of chart regions, by the fourth position correction processing unit.

According to another aspect, in the colorimetric device described above, the chart definition information further includes patch color definition information representing colors of each of the plurality of patches, and the patch position correction processing unit includes a patch color detection processing unit that obtains a color of a patch positioned in a specific position set in advance, in the plurality of patches, as specific position patch color measurement information, from the image of the color chart acquired in the image acquisition processing unit, a patch color comparison processing unit that compares a color of a patch represented by the patch color definition information of the patch positioned in the specific position, included in the chart definition information which is stored in the chart definition information storage unit, with the color of the patch obtained in the patch color detection processing unit, a chart arrangement direction detection processing unit that obtains an arrangement direction of the color chart on the basis of a result of performing the comparison in the patch color comparison processing unit, and a fifth position correction processing unit that obtains the patch position correction information by correcting the patch position measurement information which is obtained in the patch position processing unit on the basis of the arrangement direction of the color chart obtained in the chart arrangement direction detection processing unit. There may be one specific position, and there may be a plurality of specific positions. In a case where there are the plurality of specific positions, it is preferable that the specific positions are sequentially adjacent to each other.

A case can be obtained in which the arrangement direction of the color chart provided in the colorimetric device is not coincident with the predetermined arrangement direction which is assumed by the chart definition information. The colorimetric device described above compares the color of the patch obtained in the patch color detection processing unit, with respect to the patch positioned in the specific position set in advance, with the color of the patch represented by the patch color definition information, by the patch color comparison processing unit, obtains the arrangement direction of the color chart on the basis of the comparison result, by the chart arrangement direction detection processing unit, and obtains the patch position correction information by correcting the patch position measurement information on the basis of the obtained arrangement direction of the color chart, by the fifth position correction processing unit. For this reason, even in a case where the arrangement direction of the color chart is not coincident with the predetermined arrangement direction of the chart definition information, which is assumed, the colorimetric device described above is capable of obtaining each more accurate position with respect to each of the plurality of patches.

Furthermore, a colorimetric method according to another aspect is a colorimetric method of a colorimetric device including a colorimetric unit that measures a color, an imaging unit that acquires an image, a moving unit that relatively moves a position of the colorimetric unit with respect to a sheet of an object to be measured, a control processing unit that controls the colorimetric unit, the imaging unit, and the moving unit, and a chart definition information storage unit that stores chart definition information including at least patch position definition information representing each position of a plurality of patches in a color chart including the plurality of patches, which are predetermined color regions, and the method includes: an image acquisition processing step of acquiring an image of the color chart by the imaging unit; a patch position processing step of obtaining patch position measurement information representing the position of the patch on the basis of the image of the color chart which is acquired in the image acquisition processing step; a patch position correction processing step of obtaining patch position correction information by correcting the patch position measurement information obtained in the patch position processing step, on the basis of the chart definition information which is stored in the chart definition information storage unit; and a color measurement processing step of relatively moving the position of the colorimetric unit with respect to the color chart to each of the positions of the plurality of patches represented by the patch position correction information obtained in the patch position correction processing step by the moving unit, and of measuring each color of the plurality of patches by the colorimetric unit.

Such a colorimetric method corrects the actually measured patch position measurement information which is obtained by the patch position processing step on the basis of the image of the color chart actually acquired in the image acquisition processing step, on the basis of the chart definition information, and thus, is capable of obtaining each more accurate position with respect to each of the plurality of patches. Then, the colorimetric method described above relatively moves the position of the colorimetric unit with respect to the color chart to each of more accurate positions by the moving unit, and measures the colors of each of the plurality of patches by the colorimetric unit. For this reason, the colorimetric method described above is capable of performing the colorimetry with respect to each patch in a more suitable position.

This application is based on Japanese Patent Application No. 2014-231863, filed on Nov. 14, 2014, and the contents thereof are incorporated herein.

In order to express the present invention, the present invention has been suitably and sufficiently described through the embodiments in the above description with reference to the drawings, but it should be recognized that a person skilled in the art is able to easily modify and/or improve the embodiments described above. Therefore, insofar as modifications or improvements performs by the person skill in the art is not in the level of departing from the scope of the claims, it is interpreted that the modifications or the improvements are included in the scope of the claims.

INDUSTRIAL APPLICABILITY

According to the present invention, it is possible to provide a colorimetric device and a colorimetric method.

The invention claimed is:
1. A colorimetric device comprising:
a colorimetric unit that measures a color;
an imaging unit that acquires an image;
a moving unit that relatively moves a position of the colorimetric unit with respect to a sheet of an object to be measured;
a chart definition information storage unit that stores chart definition information including at least patch position definition information representing each position of a plurality of patches in a color chart including the plurality of patches, which are predetermined color regions;
an image acquisition processing unit that acquires an image of the color chart by the imaging unit;
a patch position processing unit that obtains patch position measurement information representing the position of the patch on the basis of the image of the color chart which is acquired in the image acquisition processing unit;
a patch position correction processing unit that obtains patch position correction information by correcting the patch position measurement information obtained in the patch position processing unit, on the basis of the chart definition information which is stored in the chart definition information storage unit; and
a color measurement processing unit that relatively moves the position of the colorimetric unit with respect to the color chart to each of the positions of the plurality of patches represented by the patch position correction information obtained in the patch position correction processing unit by the moving unit, and measures each color of the plurality of patches by the colorimetric unit,
wherein the chart definition information further includes patch quantity definition information representing the number of plurality of patches, and
the patch position correction processing unit includes
a patch quantity detection processing unit that obtains patch quantity measurement information representing the number of patches which is obtained from the image of the color chart on the basis of the patch position measurement information obtained in the patch position processing unit,
a patch quantity comparison processing unit that compares the number of patches represented by the patch quantity definition information included in the chart definition information which is stored in the chart definition information storage unit with the number of patches represented by the patch quantity measurement information obtained in the patch quantity detection processing unit, and
a second position correction processing unit that supplements or partially deletes the patch quantity measurement information depending on whether the number of patches represented by the patch quantity measurement information is less or greater than the number of patches represented by the patch quantity definition information, as a result of performing the comparison in the patch quantity comparison processing unit.

2. The colorimetric device according to claim 1, wherein the patch position definition information is a local coordinate value of a chart local coordinate system in which a specific point set in advance in the color chart is set to a local coordinate origin, and
the patch position correction processing unit includes
a local coordinate origin detection processing unit that detects the local coordinate origin from the image of the color chart which is acquired in the image acquisition processing unit,
a coordinate correction processing unit that obtains patch position coordinate correction information by correcting the patch position definition information included in the chart definition information which is stored in the chart definition information storage unit, on the basis of the local coordinate origin detected in the local coordinate origin detection processing unit, and
a first position correction processing unit that obtains the patch position correction information by correcting the patch position measurement information obtained in the patch position processing unit, on the basis of the patch position coordinate correction information obtained by being corrected in the coordinate correction processing unit.

3. The colorimetric device according to claim 1, wherein the patch position correction processing unit includes
the second position correction processing unit that obtains the patch position correction information by supplementing patch position non-detection information representing a position of an undetected patch in a case where the number of patches represented by the patch quantity measurement information is less than the number of patches represented by the patch quantity definition information.

4. The colorimetric device according to claim 1, wherein the patch position correction processing unit includes
a third position correction processing unit that obtains the patch position correction information by deleting patch position false detection information representing a position of a patch erroneously detected, in a case where the number of patches represented by the patch quantity measurement information is greater than the number of patches represented by the patch quantity definition information.

5. The colorimetric device according to claim 4, wherein the chart definition information further includes chart region frame definition information representing a frame of a chart region in which the plurality of patches exist, and in a case where a position of a patch represented by the patch position measurement information which is obtained in the patch position processing unit is positioned out of the frame represented by the chart region frame definition information included in the chart definition information which is stored in the chart definition information storage unit, the third position correction processing unit sets the patch position measurement information of the patch to the patch position false detection information.

6. The colorimetric device according to claim 1,
wherein the color chart includes a plurality of chart regions in which the plurality of patches exist, and
the patch position correction processing unit includes a fourth position correction processing unit that obtains the patch position correction information in at least any one chart region of residual chart regions of the plurality of chart regions, on the basis of the patch position measurement information obtained in the patch position processing unit, in any one chart region of the plurality of chart regions.

7. The colorimetric device according to claim 1,
wherein the chart definition information further includes patch color definition information representing colors of each of the plurality of patches, and
the patch position correction processing unit includes
a patch color detection processing unit that obtains a color of a patch positioned in a specific position set in advance, in the plurality of patches, as specific position patch color measurement information, from the image of the color chart acquired in the image acquisition processing unit,
a patch color comparison processing unit that compares a color of a patch represented by the patch color definition information of the patch positioned in the specific position, included in the chart definition information which is stored in the chart definition information storage unit, with the color of the patch obtained in the patch color detection processing unit,
a chart arrangement direction detection processing unit that obtains an arrangement direction of the color chart on the basis of a result of performing the comparison in the patch color comparison processing unit, and
a fifth position correction processing unit that obtains the patch position correction information by correcting the patch position measurement information which is obtained in the patch position processing unit on the basis of the arrangement direction of the color chart obtained in the chart arrangement direction detection processing unit.

8. A colorimetric method of a colorimetric device including a colorimetric unit that measures a color, an imaging unit that acquires an image, a moving unit that relatively moves a position of the colorimetric unit with respect to a sheet of an object to be measured, a control processing unit that controls the colorimetric unit, the imaging unit, and the moving unit, and a chart definition information storage unit that stores chart definition information including at least patch position definition information representing each position of a plurality of patches in a color chart including the plurality of patches, which are predetermined color regions, the method comprising:

an image acquisition processing step of acquiring an image of the color chart by the imaging unit;
a patch position processing step of obtaining patch position measurement information representing the position of the patch on the basis of the image of the color chart which is acquired in the image acquisition processing step;
a patch position correction processing step of obtaining patch position correction information by correcting the patch position measurement information obtained in the patch position processing step, on the basis of the chart definition information which is stored in the chart definition information storage unit; and
a color measurement processing step of relatively moving the position of the colorimetric unit with respect to the color chart to each of the positions of the plurality of patches represented by the patch position correction information obtained in the patch position correction processing step by the moving unit, and of measuring each color of the plurality of patches by the colorimetric unit,
wherein the chart definition information further includes patch quantity definition information representing the number of plurality of patches, and
the patch position correction processing unit includes
a patch quantity detection processing unit that obtains patch quantity measurement information representing the number of patches which is obtained from the image of the color chart on the basis of the patch position measurement information obtained in the patch position processing unit,
a patch quantity comparison processing unit that compares the number of patches represented by the patch quantity definition information included in the chart definition information which is stored in the chart definition information storage unit with the number of patches represented by the patch quantity measurement information obtained in the patch quantity detection processing unit, and
a second position correction processing unit that supplements or partially deletes the patch quantity measurement information depending on whether the number of patches represented by the patch quantity measurement information is less or greater than the number of patches represented by the patch quantity definition information, as a result of performing the comparison in the patch quantity comparison processing unit.

\* \* \* \* \*